(12) United States Patent
Omid-Zohoor

(10) Patent No.: US 10,009,549 B2
(45) Date of Patent: Jun. 26, 2018

(54) IMAGING PROVIDING RATIO PIXEL INTENSITY

(71) Applicant: The Board of Trustees of the Leland Stanford Junior University, Stanford, CA (US)

(72) Inventor: Alex B. Omid-Zohoor, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days. days.

(21) Appl. No.: 15/119,571

(22) PCT Filed: Feb. 27, 2015

(86) PCT No.: PCT/US2015/018002
§ 371 (c)(1),
(2) Date: Aug. 17, 2016

(87) PCT Pub. No.: WO2015/131045
PCT Pub. Date: Sep. 3, 2015

(65) Prior Publication Data
US 2017/0064211 A1     Mar. 2, 2017

Related U.S. Application Data

(60) Provisional application No. 61/946,147, filed on Feb. 28, 2014.

(51) Int. Cl.
*H04N 5/232* (2006.01)
*H04N 5/243* (2006.01)
(Continued)

(52) U.S. Cl.
CPC ......... *H04N 5/243* (2013.01); *H04N 5/23241* (2013.01); *H04N 5/355* (2013.01); *H04N 5/374* (2013.01); *H04N 5/378* (2013.01)

(58) Field of Classification Search
CPC .... H04N 5/23241; H04N 5/243; H04N 5/355; H04N 5/374; H04N 5/378; H04N 5/2352;
(Continued)

(56) References Cited

U.S. PATENT DOCUMENTS 5,363,064 A   11/1994   Mikamura
5,572,074 A   11/1996   Standley
(Continued)

OTHER PUBLICATIONS

USPTO Receiving Office. PCT Search Report for PCT/US2015/018002 dated Jun. 3, 2016.
(Continued)

*Primary Examiner* — Tuan Ho
*Assistant Examiner* — Marly Camargo
(74) *Attorney, Agent, or Firm* — Crawford Maunu PLLC

(57) ABSTRACT

Aspects of the present disclosure are directed to apparatuses, systems and methods involving imaging providing pixel intensity ratios using circuitry. According to an example embodiment, an apparatus includes a photosensor array having an array of sensors and a circuitry. Each sensor of the photosensor array provides a signal value for a pixel that is indicative of an intensity of light detected. Further, the circuitry responds to the signal values from a plurality of sensors of the photosensor array, by converting signals indicative of a ratio of pixel intensity values to a digital signal that characterize at least an edge of an object corresponding to or associated with the intensity of the detected light. The circuitry provides digital signals, each indicative of a ratio of pixel intensity values, for respective sensors of the photosensor array.

21 Claims, 8 Drawing Sheets

(51) Int. Cl.
*H04N 5/343* (2011.01)
*H04N 5/355* (2011.01)
*H04N 5/374* (2011.01)
*H04N 5/378* (2011.01)
*H01L 27/146* (2006.01)

(58) Field of Classification Search
CPC ...... H04N 5/343; H03M 1/1235; H03M 1/18; H01L 27/14643
USPC .... 348/222.1, 297, 308, 301, 302, 353, 365, 348/252, 597, 625, 606, E5.052; 382/276, 274, 199, 266, 255, 268, 263; 341/155, 161, 162, 158, 153; 250/208.1, 250/214.1, 214 R; 345/174, 586, 633; 363/23; 307/113; 327/63, 68, 80
See application file for complete search history.

(56) References Cited

U.S. PATENT DOCUMENTS

| | | | |
|---|---|---|---|
| 5,629,702 A * | 5/1997 | Koyasu | H03M 1/42 327/80 |
| 6,825,876 B1 | 11/2004 | Easwar et al. | |
| 7,088,396 B2 | 8/2006 | Fredlund et al. | |
| 7,346,221 B2 | 3/2008 | Chanas et al. | |
| 7,369,161 B2 | 5/2008 | Easwar et al. | |
| 7,847,833 B2 | 12/2010 | Easwar et al. | |
| 7,936,392 B2 | 5/2011 | Ng | |
| 7,978,912 B2 | 7/2011 | Kamon | |
| 8,564,683 B2 | 10/2013 | Easwar et al. | |
| 2005/0103981 A1 | 5/2005 | Knee et al. | |
| 2005/0259158 A1 | 11/2005 | Jacob et al. | |
| 2010/0302399 A1 | 12/2010 | Lin | |
| 2012/0127124 A1 | 5/2012 | Zanone et al. | |
| 2012/0189191 A1 | 7/2012 | Bai et al. | |
| 2013/0273968 A1 * | 10/2013 | Rhoads | G06F 17/30244 455/556.1 |

OTHER PUBLICATIONS

Jaehyuk Choi, et al., "A 3.4uW CMOS Image Sensor with Embedded Feature-Extraction Algorithm for Motion-Triggered Object-of-Interest Imaging", IEEE International Solid-State Circuits Conference 2013. 478.

Jeff Bier, "Computer Vision in Mobile Devices: The Next Killer App?", BDTI 2011 Linley Tech Mobile Device Conference.

LiKamWa, Robert, et al. "Energy characterization and optimization of image sensing toward continuous mobile vision." Proceeding of the 11th annual international conference on Mobile systems, applications, and services. ACM, 2013.

Kim, Gyouho, et al. "A 467nW CMOS visual motion sensor with temporal averaging and pixel aggregation." 2013 IEEE International Solid-State Circuits Conference Digest of Technical Papers. IEEE, 2013.

Everingham, Mark, et al. "The pascal visual object classes (voc) challenge." International journal of computer vision 88.2 (2010): 303-338.

Felzenszwalb, P. F. and Girshick, R. B. and McAllester, D. and Ramanan, D., "Object Detection with Discriminatively Trained Part Based Models", IEEE Transactions on Pattern Analysis and Machine Intelligence, 2010, vol. 32, 9, pp. 1627-1645 Release 5.

Dalal, Navneet, and Bill Triggs. "Histograms of oriented gradients for human detection." 2005 IEEE Computer Society Conference on Computer Vision and Pattern Recognition (CVPR'05). vol. 1. IEEE, 2005.

* cited by examiner

IMAGING PROVIDING RATIO PIXEL INTENSITY

PRIORITY

This patent document claims benefit under 35 U.S.C. § 119(e) of U.S. Provisional Patent Application Ser. No. 61/946,147 filed on Feb. 28, 2014, and entitled "Imaging with Subsampling and/or Gradient Detection" and which is fully incorporated herein by reference in its entirety, as well as for the aspects specifically noted herein and for aspects readily recognized by the common disclosure (e.g., figures and related discussion).

OVERVIEW

Due to the increasing imaging capabilities of mobile computers, such as a cellphone, applications are using imaging to perform a variety of functions. For example, in certain non-limiting imaging applications, benefit is realized from having a constant stream of images and/or continuous stream over a period of time. However, this application type and other imaging applications often use high amounts of power which inhibit or prevent the imaging from being used for certain periods of time or in an "always on" mode.

Various example embodiments are directed to imaging methods, apparatuses and related implementations concerning image capture via pixel-based data circuits such as apparatuses using photosensor arrays to provide image data and in certain embodiments relating to (mobile computer) vision implementations that can be used for certain periods of time or in an "always on" mode (to continuously capture and process visual information). Some embodiments include image subsampling, performed in (computer) vision algorithms that use features that are not scale invariant, to minimize electrical power use in the analog and/or digital domain. For instance, some embodiments may involve capturing images at low resolution, and subsampling in the analog domain to build a "pyramid" of the image at different scales. By contrast, capturing high-resolution images may use higher power consumption (e.g., for processing many pixels). Further, down sampling in the digital domain as may involve convolution with Gaussian kernels to perform spatial low-pass filtering (blurring) before point-sampling (e.g., to address aliasing). Embodiments in accordance with the present disclosure can include circuitry to minimize analog power use without degrading image quality.

Various other embodiments are directed to imaging applications involving the capture of quality gradients. Capturing quality gradient can benefit from the capture of high bit-depths to achieve a resolution in gradient intensity, particularly for high dynamic range scenes, which requires high power. For example, natural scenes have a very high dynamic range, whereas the illuminance of an indoor scene with lights on can be about 100 times less than the illuminance of a sunlit outdoor scene. Furthermore, for a given light source, the illuminance of a diffuse black surface can be about 100 times less than the illuminance of a diffuse white surface. Often, different parts of a scene will have different light sources. For example, a scene captured via camera from indoors may simultaneously include an area lit by indoor lighting, and an area lit by the sun (through a window or doorway). In such a case, the absolute difference in illuminance between a diffuse white and black surface outdoors may be about 100 times larger than the absolute difference between a diffuse white and black surface indoors, due to the different lighting sources. In order to capture the details of the gradients in the darker indoor portion of the scene, it can be beneficial to digitize the pixel-related data using a small illuminance per bit, and capturing the entire high dynamic range scene at this resolution may require an analog to digital converter with a very large bitdepth (total number of bits).

Various embodiments address include a circuitry interfaced with a photosensor array via a readout circuit, with the circuitry being configured and arranged to digitize image data from the readout circuit in order to provide pixel-intensity data useful for characterizing at least some aspects of the subject (or object) in the view of the photosensor array. Example embodiments are directed to an apparatus including a photosensor array, and a specific implementation of such circuitry arranged to form feature descriptor data (or more generally, feature-description data) that characterize edges or boundary areas of the subject (or object). Each sensor provides a signal value for a pixel that is indicative of an intensity of light detected. The circuitry responds to signal values from a plurality of sensors of the photosensor array, by converting signals indicative of a ratio of pixel intensity values to a digital signal that characterizes at least an edge of an object corresponding to or associated with the intensity of the detected light. The circuitry, in various embodiments, is configured and arranged to provide digital signals, each indicative of a ratio of pixel intensity values, for respective sensors of the photosensor array. The digital signals indicative of the ratio of pixel intensities are sent to a processor circuit for further processing. The digital signals indicative of the ratio of pixel intensities can represent less data than digital signals indicative of individual raw pixel intensity values and, therefore, require less power to further process.

Another apparatus embodiments includes a photosensor array having an array of sensors, each sensor being configured and arranged to provide a signal value for a pixel that is indicative of an intensity of light detected, and circuitry. The circuitry is arranged such that the circuitry receive, as inputs, the output signal values indicative of pixel intensity values from sensors (e.g., adjacent sensors) of the photosensor array. In some embodiments, the routing of the signal values from sensors to the circuitry can be achieved using a readout circuit interfaced with the photosensor array.

Further, in some embodiments, the circuitry includes a first divider circuit, a second divider circuit, and two comparators. The first divider circuit changes an output of a first sensor to produce a percentage of the output of the first sensor. The second divider circuit changes an output of a second sensor to produce a percentage of the output of the second sensors. The two comparators include a first comparator to compare the percentage of the output of the first sensor to the output of the second sensor, and a second comparator compare the percentage of the output of the second sensor to the output of the first sensor. The apparatus embodiment are used, in various embodiments, to perform a variety of methods. An example method embodiment includes capturing, using a photosensor array of an apparatus, image data from light rays the photosensor array having an array of sensors, each sensor being configured and arranged to provide a signal value for a pixel that is indicative of (e.g., proportional) an intensity of light detected and each signal value including an analog signal indicative of a corresponding pixel intensity value. The method further include providing signal values, using a readout circuit of the apparatus, from a plurality of sensors of the array of sensors to circuitry of the apparatus. Further, the method includes using the circuitry to provide signals indicative of a ratio of pixel intensity values from adjacent sensors of the plurality of sensors based on the signals values, and convert the signals indicative of the ratio of pixel intensity values to a digital signal that characterizes at least an edge of an object corresponding to or associated with the intensity of light detected. The circuitry is configured and arranged to provide digital signals, each signal indicative of a ratio of pixel intensity values, for respective sensors of the photosensor array. Further, the method includes detecting and localizing, using a processor circuit, an object using the digital signals.

Various embodiments address such challenges by spatially low-pass filtering in the optical domain, which facilitates subsampling with reduced aliasing (e.g., which can be implemented with little or no electrical power dissipation). Certain embodiments address such challenges by using linear sensors and known gradient relationships to determine gradient intensities.

According to another example embodiment, an apparatus includes an input port that receives an output from a photosensor array indicative of light detected from a scene, and a processor circuit that captures a spatially subsampled image of the scene. Specifically, the processor circuit operates with the input port to capture the image based on circles of confusion for rays of the light corresponding to points on an object in the scene, and an inversely-proportional relationship between image size of the object and distance at which the light travels from the object. In various contexts, the circle of confusion for each point serves the role of an antialiasing filter, which when applied before point sampling, facilitates subsampling without aliasing.

Other embodiments are directed to an apparatus or method using relationships pertaining to a circle of confusion and an approximation of object height based on object distance, to capture an optically down sampled image of an object of a given size at a relatively constant spatial resolution. The image is captured with suppressed aliasing effects, at various object distances by point-sampling image sensor pixels that collect light from the object.

Other embodiments are directed to an apparatus or method in which image data is captured from light rays from a scene using linear sensors (e.g., pixels) having signal values (e.g., signal values readout from the photosensor array, which are sometimes referred to as "readout signal values") that are linearly proportional to an intensity of the light rays. The signal values are used to ascertain characteristics of the scene.

Another embodiment is directed to an apparatus including an image sensor, an analog logarithmic compression circuit, an analog differencing circuit, an analog to digital converter and a processor circuit. The image sensor has linear sensors (e.g., pixels) that provide signal values that are linearly proportional to intensity of light rays received from a scene. The analog logarithmic compression circuit logarithmically compresses the signal values, and the analog differencing circuit provides an analog gradient output indicative of a difference between logarithmically compressed signal values of respective pixels of interest. The analog to digital converter digitizes the analog gradient output, and the processor circuit provides an illuminance ratio of the respective pixels, using the digitized gradient output.

The above overview is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
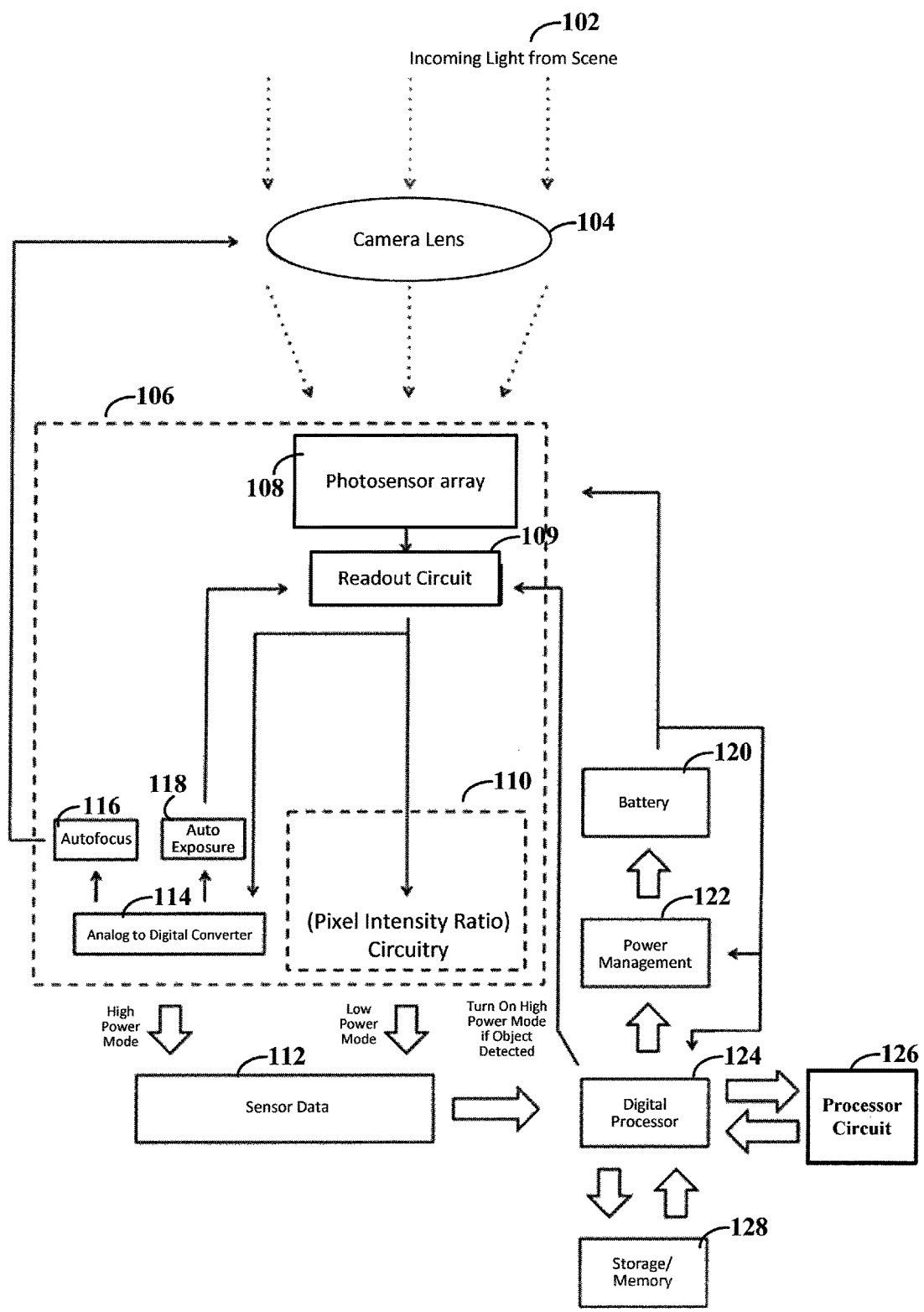
FIG. 1 shows an example of an imaging apparatus, in accordance with various embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are directed to apparatuses, systems and methods involving imaging providing pixel intensity ratios using circuitry, which may be implemented for a variety of applications such as those involving machine vision or computer vision, and with devices of those benefiting from low-power consumption (e.g., portable devices). While not necessarily so limited, various aspects may be appreciated through a discussion of examples using these and other contexts.

Embodiments of the present disclosure are directed toward imaging devices that provide a form of down sampling for image data received from a photosensor array. For instance, the photosensor array can include an array of individual image sensors (herein generally referred to as "sensors"), which can have a relatively large pixel counts or pixel densities. A (relatively) low power circuitry can be configured to provide an effective down sampling of the image data from the photosensor array. This can be particularly useful for reducing the processing by an analog to digital converter circuit and/or a digital processing circuit, such as a digital signal processor (DSP). Particular embodiments are directed toward an array of low power circuits that provides a digital value based upon a comparison of relative intensities between adjacent pixels, which can be useful for object detection or other applications. For example, the low power circuitry can include an analog pixel intensity ratio to digital converter circuitry that is configured to compare different relative percentages of intensities between adjacent pixels and provide a digital value that represents the relative intensity differences. In this manner, the digital values can indicate corresponding ranges of intensity differences between adjacent pixels.

Consistent with certain embodiments, a device with a photosensor array and corresponding low power circuitry can be operated in multiple imaging modes. For instance, in a first imaging mode a DSP can receive data from the low power circuitry. Thus, the DSP may consume less power because the data is provided as down sampled digital information. In a second imaging mode, the DSP can receive data from the individual image sensors (e.g., pixel intensity values) via an analog to digital converter circuit. In this second mode, the device can convert more information from analog signals to digital signals and may consume more power due, at least in part, to converting the additional analog data into digital signals. As an example use of such modes, the device can be configured to operate in the first mode to detect a trigger event relating to object detection (e.g., as might be useful for security purposes). In response to the trigger event, the device can switch to the second mode to capture images.

Relative to various image processing techniques, a representation of a scene, in some instances, can be provided by extracting edges of detected light intensities. Some approaches for extracting edges include computing gradients of pixel intensity values. That is, for each pixel (x, y) of interest, a gradient in the x and y direction as $gx=I(x+1, y)-I(x-1, y)$ and $gy=I(x, y+1)-I(x, y-1)$ is provided, where $I(x,y)$ represents the intensity value of the pixel at location (x, y). However, for many camera implementations, the gradients gx and gy of the captured image are dependent on the scene illumination conditions and camera exposure settings. In a simple case, where pixel intensity values are linearly proportional to pixel illuminance, and thus scene intensity, gradient magnitude is proportional to both scene illumination and camera exposure settings.

For photography applications, adequately capturing a scene's dynamic range can be beneficial for forming a visually appealing image. Thus, high quality cameras capture images at high pixel bitdepths before additional image processing is performed. However, the power consumption in current mobile image sensors can be dominated by the analog to digital conversion power, which increases with increasing pixel bitdepth. Accordingly, aspects of the present disclosure can be useful for low-power computer vision applications that can use a reduced bitdepth of analog to digital conversions per pixel without significantly reducing performance.

For object-detection, pixel intensity variations due to reflectance discontinuities and depth discontinuities can be relevant. Unlike pixel illumination variations, due to scene illumination, the pixel illumination variation due to reflectance discontinuities under constant scene illumination that describes edges of interest span roughly 2 or fewer orders of magnitude (the illuminance ratio of a diffuse white surface vs. a diffuse black surface under the same scene illumination is typically less than 100:1). Furthermore, pixel illumination variation due to depth discontinuities that describes edges of objects of interest can also be represented with roughly 2 or fewer orders of magnitude without significant degradation in object detection performance.

Embodiments in accordance with the present disclosure include a hardware implementation (e.g., via circuitry that can be interfaced with the photosensor array through one or more readout circuits) for an edge representation that is invariant to scene illumination and camera exposure settings, which consumes less power and/or energy than other approaches while achieving the same computer vision algorithm performance. Rather than representing edges as two-dimensional (2D) gradients (e.g., subtractions) of pixel intensity values, embodiments in accordance with the present disclosure represent edges as ratios of pixel intensity values. Further, in various embodiments, the ratio of pixel intensity values are provided before and/or during the analog to digital conversion. That is, rather than first converting analog pixel intensity values to digital values and then computing 2D gradients of pixel intensity values by subtracting these digital values, the ratio of analog pixel intensity values is provided (e.g., output and/or computed) before or during the analog to digital conversion. Embodiments are directed toward the recognition that the conversion of analog pixel intensity values and subsequent processing can consume a significant amount of power due to, among other considerations, the high resolution of the digital values, which is often used to capture images of acceptable quality.

Various embodiments can thereby use circuitry so that the absolute pixel intensity values, which are subject to the roughly 9 orders of magnitude in variation due to scene illumination need not be separately digitized. Instead, the ratios of pixel intensity values from adjacent sensors, whose values that describe edges of objects of interest only span 2 or fewer orders of magnitude, are digitized by the circuitry. Therefore, lower bitdepths of analog to digital conversions per pixel can be used to save power and/or energy consumption while still achieving the same performance as traditional implementations.

For example, various embodiments are directed to a system-level technique implementing a photosensor array with an array of sensors, followed by an analog logarithmic compression circuit, an analog differencing circuit, and an analog to digital converter. In such instances, the analog logarithmic compression circuit, the analog differencing circuit, and the analog to digital converter comprise the circuitry and/or a portion of the circuitry. The photosensor array contains sensors whose signal values (e.g., voltage values) are indicative of a light intensity of a pixel. For example, the signal values include analog signals indicative of corresponding pixel intensity values. A pixel is generally referred to as data of a particular dimension of an image. Each sensor in the array captures signal values (e.g., voltage values) which are representative of the light intensity of a pixel. In some instances, the sensor is referred to as an image data pixel. As such, as used herein, the concept of the term pixel generally includes data but can also be used to refer to the sensor associated with the data, for ease of discussion.

The intensity values of pixels from adjacent sensors, in some embodiments, are compared, and edges of an image/scene are extracted based on the comparison. Such edges in an image can be caused by various effects in the imaged scene, including surface orientation discontinuities, illumination discontinuities (highlights, shadows), reflectance discontinuities (change in surface material properties, such as color), and depth discontinuities (border between foreground object and background).

In various embodiments, the signal values (e.g., analog signals indicative of a corresponding pixel intensity values) of two or more sensors is input to circuitry via a readout circuit. In some embodiments, the circuitry includes a plurality of circuits, such as an array, of analog pixel intensity ratio to digital converter circuits. The circuitry, in various embodiments, includes an analog logarithmic compression circuit. An analog logarithmic compression circuit outputs a value that is equal to the logarithm of the inputs. The logarithmically compressed outputs can be input to an analog differencing circuit that outputs a difference of the inputs. This output, which is the difference (or gradient) of logarithms, can be input to an analog to digital converter for digitization. By using such linear sensors (e.g., with a relatively low fixed pattern noise) and logarithmic compression that is performed with a separate analog circuit, problems relating to the use of logarithmic pixels can be addressed.

In some embodiments, an analog exponential amplifier circuit is coupled between the analog differencing circuit and the analog to digital converter. The exponential amplifier circuit takes the difference of logarithms (which equals the logarithm of illuminance ratio) as an input, and outputs the illuminance ratio.

Such a logarithmic approach can be implemented in a variety of applications. In some embodiments, low-power (logarithmic) gradient (feature) extraction is implemented for computer vision applications on mobile platforms, including wearable camera platforms. By consuming relatively low power, an "always on" camera (or machine vision/computer vision portion of a camera) can be provided for capturing time-stamped visual information about scene context. For certain computer vision applications, such as object detection, much of the useful information in a scene can be captured in edges or gradients. These gradients represent differences in scene illuminance captured by pixels. In some implementations, this visual information is used to perform real-time object detection for augmented reality applications. In other implementations, this information is processed later on a backend server and combined with other sensor data from a particular user to extract useful relationships. For example (and as similar to other examples discussed above), if a user wears a heart rate monitor that logs time-stamped heart rate, this data can later be correlated with object detection data computed from time-stamped visual context information. Such information can be used, for example, to characterize relationships between heart rate and a visual scene in front of the user (e.g., to detect whether or not the user is looking at a computer screen).

Various aspects are directed to addressing challenges to collecting gradient information, such as those discussed above, by using characteristics of a ratio of illuminance between a diffuse white and a diffuse black surface as being about constant regardless of the intensity of the light source (illumination invariant). The logarithm of the linear pixel intensity values is taken, and the difference of logarithms is used to compute a value that is the logarithm of the ratio of illuminances. In connection with one or more embodiments, the difference of logarithms calculated between a diffuse white and black surface outdoors is equal to the difference of logarithms calculated between a diffuse white and black surface indoors, despite the different lighting sources. This difference of logarithms is digitized and used to provide a resolution in gradient intensity that is not dependent on the dynamic range of the scene. Using this approach, gradients can be detected for relatively high dynamic range scenes without necessarily implementing higher bitdepths. Such embodiments also facilitate the use of low-power analog to digital converters.

In some embodiments, an upper bound on the maximum ratio of illuminances that can be captured is set based on the illuminance ratio between diffuse white and diffuse black surfaces for a given light source (e.g., about 100). Such embodiments capture useful edge information that, for computer applications such as object detection, relates to differences in the absorption spectra of a scene rather than differences in lighting sources (such as shadows).

In some embodiments, logarithmic compression is applied to linear pixels as follows. For a pixel output voltage V, scene intensity X, and an exposure setting determined by a constant scaling factor K, the following equation characterizes a relationship of these values:

$$V = KX$$

Applying logarithmic compression to V (Y=log(V)), and using a gradient Y2−Y1, the result is:

Y2−Y1=log(V2)−log(V1)=log(KX2)−log(KX1)=log ((KX2)/(KX1)) log(X2/X1). Thus, the scaling factor K can be overlooked with the result being a log ratio of input intensities, which is illumination invariant.

In some implementations, objects of interest and the background are assumed to have the same source of illumination (e.g., sun, indoor lamps), and the maximum gradient corresponds to a factor of 100 (e.g., black vs. white surface). The effect of objects that have different sources of illumination than their backgrounds is suppressed by applying a truncation (or clipping) function to the gradient calculation, such that the maximum gradient allowed corresponds to a ratio of 100:1, and everything above this gets mapped to 100. Certain embodiments are directed to a differential logarithmic amplifier that takes the difference of the logarithmic compressed values in such a way that clips. Further, a logarithmic gradient angle is used in other embodiments.

Mathematically, the gradient of the logarithm of pixel intensity values A and B is equivalent to the logarithm of the ratio of the pixel intensity values: log(A)−log(B)=log(A/B). Thus, 'gradients of logarithms' represent a logarithmically compressed representation of the ratios of pixel intensity values described above. Therefore, as used herein, ratios of pixel intensity values can be referred to as "gradients of logarithms". The gradients of logarithms can be processed to create a rose-diagram based visualization of a Histogram of Oriented Gradient (HOG) based on the gradients of logarithms, among other techniques, in various embodiments. For example, a local histogram normalization can be applied prior to creating the rose-diagram.

Various example embodiments are directed to ascertaining information about a scene using blurring characteristics of light rays detected from the scene as related to focusing properties of an optical lens via which the light rays are collected. Certain embodiments detected scene characteristics based on out-of-focus aspects of an image captured from a scene (e.g., as applicable to a circle of confusion for each respective out-of-focus point), relative to a known focus distance of the optical lens. Such embodiments may employ characteristics of an image plane (e.g., relative to an image sensor), which includes out-of-focus areas due to circles of confusion, used to generate a spatially low-pass filtered (or spatially subsampled) image. Using these approaches, aspects of the scene as may relate to object size, object location and other object detection aspects can be ascertained.

Various embodiments are also directed to an apparatus, including a processor circuit that processes image data pertaining to the above. In some embodiments, the apparatus also includes an image sensor (e.g., a photosensor array) that captures out-of-focused light rays as may correspond to the circles of confusion. In certain embodiments, the apparatus also includes a fixed focal length lens having a fixed focus at a long distance (e.g., infinity), and a fixed aperture. Such an image sensor may be implemented with random access readout (e.g., a complementary metal-oxide-semiconductor (CMOS) image sensor) to facilitate the selective processing of a subset of captured pixels. For instance, if an object lies at the focus distance, a point on the object is mapped to a point on the image plane (at the image sensor). However, if the object lies at a distance that is unequal to the focus distance, a point on the object will be mapped to an area on the image plane (image sensor) pertaining to the circle of confusion, and creates a blurry (spatially low-pass filtered) image. This mapping is used to ascertain information about the object, such as location and/or object type.

One or more embodiments are directed to capturing images with linear pixels, logarithmically processing data from the pixels, and comparing the data from respective pixels to provide an indication of one or more gradients in the scene. Such an approach may, for example, be implemented to detect an object in the scene. For instance, an analog logarithmic compression circuit can be used to logarithmically compress data from an image sensor, which can then be processed by an analog differencing circuit to provide a difference (gradient) between respective pixels. Further, the gradients can be used together with the above-discussed approaches to detecting scene characteristics using images with out-of-focus (blurred) regions due to circles of confusion.

Another example embodiment is directed to an apparatus including a processor circuit that captures a spatially subsampled image of the scene based on a circle of confusion for rays of the light and an inversely-proportional relationship between image size of the object and distance at which the light travels from the object. The circle of confusion corresponds to a point on an object in the scene that is out-of-focus. In this context, out of focus areas may be the result of different circles of confusion for different points in the scene, and may act as an antialiasing filter that may, for example, be applied before point sampling.

The processor circuit is implemented in a variety of manners to suit particular embodiments. In some embodiments, the processor circuit is connected to an input port that receives an output from a photosensor array, with the output being indicative of light detected from a scene. Such an input port may, for example, include a circuit connector that connects a processor within a camera to a photosensor array used to detect light focused via a lens or lenses, or to processing circuitry at the photosensor array that sends information to a larger image processor located within a camera or elsewhere. In certain embodiments, the processor circuit captures time-stamped visual information about scene context. In other embodiments, the processor circuit uses spatially subsampled images of the scene to perform real-time object detection for augmented reality applications. Such object detection may, for example, relate to detecting an object type, or identifying a specific object (e.g., identifying an object as a face, or more specifically identifying a person). Further, performing object detection on images at multiple scales may involve subsampling at various degrees to form an image or feature pyramid. In one related embodiment, the readout circuitry performs low-power image downsampling in the analog domain through analog pixel binning or charge sharing in a switched capacitor array, thus enabling the extraction of feature descriptors at multiple scales in order to facilitate the detection of objects at multiple scales.

In other embodiments, the processor circuit spatially low pass filters the image of the scene by capturing the subsampled image of the scene from a subset of pixels from the photosensor array that detect the rays of light from the scene, regions of which may be out of focus due to circles of confusion, with the subset being based on a point sampling-based scaling factor.

Certain embodiments are directed to a processor circuit that includes one or more computer processors that correlate physiological data detected concurrently with the light detected from the scene, use of the spatially subsampled image of the scene to detect objects in the scene, and provide an output indicative of characteristics of the physiological data relating to the detected objects. In other embodiments, the processor circuit uses the spatially subsampled image of the scene to detect a size of the object in the scene based upon a degree of blurring of the object in the circle of confusion, as may be due to the radii of circles of confusion created on the image plane by points on the object. In still other embodiments, the processor circuit uses the spatially subsampled image of the scene to detect a characteristic of the object in the scene based upon a degree of blurring of the object due to the radii of circles of confusion created on the image plane by points on the object, and selects an image processing model from one of a plurality of models respectively corresponding to different object characteristics, based upon the detected characteristic.

In some embodiments, the apparatus also includes the photosensor array as well as a fixed aperture and lens having a fixed focal length and fixed focus distance. The aperture and lens pass the light from the scene to the photosensor array which detects the light. Each circle of confusion corresponds to rays of light that are out-of-focus when arriving at the photosensor array via the fixed aperture and the lens (e.g., with respective circles of confusion pertaining to respective points (which could belong to objects)).

The lens and aperture are implemented in a variety of manners to suit different applications. In some implementations, the lens has a fixed focus distance of infinity and the photosensor array is located at a distance of the fixed focal length from the lens. In certain implementations, the lens has a fixed focus distance at infinity and presents an image at the photosensor array that blurs objects that are close to the lens. The processor uses the blurred objects to detect the presence of, and provide contextual information for, the objects. In other implementations, the apparatus includes another lens that presents a focused image representing the scene upon sensors in the photosensor array, and the processor captures the focused image and uses the circle of confusion for the out-of-focus rays of light to detect contextual information about the captured focused image.

In some embodiments, the fixed aperture and lens pass the light from the scene by spatially low-pass filtering light rays corresponding to the object, and provide an image including the spatially low-pass filtered light rays on the circle of confusion for each out-of-focus point, and in an image plane in which the photosensor array lies. The processor circuit and photosensor array capture the spatially subsampled image of the scene using the spatially low-pass filtered light rays, by capturing out-of-focus areas of the scene that exhibit reduced aliasing relative to in-focus areas of the scene.

In some implementations involving a fixed aperture, fixed focal length and fixed focus distance, the degree of spatial low-pass filtering of the incident light rays depends on the distance the light rays travel before reaching the imaging apparatus. For example, for a fixed focus distance of 100 meters, in a scene that includes a person 10 meters away in front of a wall 100 meters away, the rays of light from the person will be out of focus and spatially low-pass filtered, but the rays of light from the wall will generally be in-focus.

In a more particular embodiment, the processor circuit and photosensor array capture the spatially subsampled image of the scene using, for each point in the scene that is out-of-focus, portions of an image in the circle of confusion for that point having a diameter "c." This circle of confusion is in an image plane in which the photosensor lies with the diameter defined as c=(f*A)/d, where d is the distance of the object from the lens, f is the fixed focal length and A is the diameter of the fixed aperture. This approach as well as other approaches herein may be used to capture a spatially subsampled image of the scene in which out-of-focus areas of the scene exhibit reduced aliasing or no aliasing due to the spatial low-pass filtering of the incident light rays, using portions of the original image of the scene corresponding to out-of-focus areas caused by circles of confusion.

In certain embodiments, the processor circuit is configured and arranged with the photosensor array to capture the spatially subsampled image of the scene using an inversely-proportional relationship between image size of the object and distance of the object from the lens. In some implementations, this relationship is defined by $H\_i=(f*H\_o)/(d-f)$, where $H\_o$ is the height of the object, $H\_i$ is the image height of the object, d is distance between the lens and the object and f is the fixed focal length.

A variety of photosensor arrays may be implemented to suit particular embodiments. In some embodiments, a photosensor array as discussed above provides random access readout of pixels corresponding to photosensors in the photosensor array. The processor circuit spatially lowpass filters the image of the scene by capturing the subsampled image of the scene from a subset of pixels from the photosensor array that detect the rays of light from the scene, some of which may arrive out of focus, corresponding to circles of confusion. This subset may be based on a point sampling-based scaling factor.

Another embodiment is directed to an apparatus or method that uses relationships pertaining to a circle of confusion and an approximation of object height based on object distance to capture an optically down sampled image of an object of a given size. The image is captured at a relatively constant spatial resolution, with suppressed aliasing effects, at various object distances by point-sampling image sensor pixels that collect light from the object via respective circles of confusion for each point. In some implementations, point-sampling includes reading out ones of the image sensor pixels with coordinates (x,y) such that x and y are both divisible by an integer n that is greater than 1. In certain embodiments, the image of the object is spatially low-pass filtered using data captured via the point-sampled image sensor pixels. In other embodiments, a characteristic of the object is detected using the optically down sampled image, and the detected characteristic is used with a focused image of the object captured to provide contextual information about the object in the focused image.

Another embodiment is directed to an apparatus or method in which image data from light rays from a scene are captured using sensors of a photosensor array having signal values (e.g., voltages) that, after a given exposure, are proportional to an intensity of the light rays. The signal values are used to ascertain characteristics of the scene. In some implementations, the signal values and corresponding intensity are used via the processor circuit and circle of confusion aspects described above to detect objects in the scene.

The signal values can be used in a variety of manners. In a particular embodiment, the signal values are logarithmically compressed and the logarithmically compressed signal values are processed via a differencing circuit that provides a gradient output that is a difference of the logarithmically compressed signal values. The gradient output is then used to ascertain the characteristics of the scene, such as for detecting objects. In some embodiments, gradient information is ascertained using a logarithm of voltage values from the linear pixels and taking a difference of logarithms (e.g., to represent high dynamic range scenes with relatively fewer bits/less data).

Another embodiment is directed to an apparatus including a photosensor array having sensors that provide signal values (e.g., voltage values) that are indicative of an intensity of light rays received from a scene. The apparatus also includes an analog logarithmic compression circuit that logarithmically compresses the signal values, an analog differencing circuit that provides an analog gradient output indicative of a difference between logarithmically compressed signal values of respective pixels of interest, and an analog to digital converter circuit that converts (e.g., digitizes) the analog gradient output to a digital signal. The apparatus further includes a processor circuit that provides an illuminance ratio of the respective pixels, using the digitized gradient output. In some implementations, the processor circuit detects objects in the scene using the illuminance ratio. In other implementations, the processor circuit correlates the detected objects to physiological data concurrently captured with the light rays from the scene.

As may be implemented in connection with one or more embodiments herein, an equation for a circle of confusion diameter in the image plane (c) vs. object distance ($S\_o$) assuming an infinite focus distance, fixed focal length (f), and fixed aperture diameter (A) is:

$$c=(f*A)/S\_o. \quad \text{(Equation 1)}$$

Thus, the circle of confusion diameter is inversely proportional to object distance, so closer objects will be blurred more than distant ones.

With a fixed focus distance and fixed focal length (f), the equation for object distance vs. object image size is:

$$H\_i=(f*H\_o)/(S\_o-f), \quad \text{(Equation 2)}$$

where $H\_o$ is object height, $H\_i$ is object image height, and $S\_o$ is object distance. Assuming that object distance ($S\_o$) is much larger than focal length (f) provides the approximation:

$$H\_i \sim = H\_o*(f/S\_o).$$

These relationships are used, for a given object, to ascertain image size as being approximately inversely proportional to object distance, such that closer objects create larger images than distant ones.

In connection with various embodiments, Equations 1 and 2 (and/or the relationships therein) are implemented to capture an image of an object of a given size at a relatively constant spatial resolution, with suppressed aliasing effects, at various object distances by point sampling image sensor pixels used to capture the image. Point sampling may, for example, involve reading out every pixel with coordinates (x,y) such that x and y are both divisible by some integer n that is greater than 1. Larger values of n are used to obtain a greater degree of subsampling.

Image-detection approaches as described herein can be implemented with a variety of applications. Some embodiments are directed to low-power image subsampling for computer vision applications on mobile platforms, including wearable camera platforms. Such an approach can be implemented with "always on" cameras that capture time-stamped visual information about scene context. In some implementations, this visual information is used to perform real-time object detection for augmented reality applications. In other implementations, this image information is processed on a backend server and combined with other sensor data to extract useful relationships. In one such example, such image information is used in connection with time-stamped physiological sensor data (e.g., a heart rate monitor) to correlate object detection data with the time-stamped visual context information. Such an approach may, for example, be implemented to ascertain a relationship between heart rate and whether or not a user is looking at a computer screen.

Various embodiments involve optics having a fixed focal length and fixed focus at infinity (or very far away), which are used to blur objects that are close to the camera. Such an approach can be implemented with object detection for contextual information, such as by distinguishing between an image of a photo of a person on a computer screen 0.5 meters away, and an image of a person standing 10 meters away. For instance, such an approach can be implemented where a person occupies the same field of view in the camera, with blurring of the photo of the person relative to blurring of the person standing 10 meters away used to distinguish the two (with closer objects exhibiting greater blurring). This approach can be used to detect real-world object size, which is useful for real-world object detection applications.

Various embodiments are directed to object detection based upon a known or fixed size, such for objects that have relatively small intra-class variation in size (e.g., automobiles, humans, animals, and bicycles). A feature pyramid is used with blurring in the optical domain and used to detect such objects and their location, understanding that closer objects are blurred more than objects further away as relative to the circle of confusion. The equation for the circle of confusion diameter in the image plane (c) vs. object distance (S2) assuming an infinite focus distance and fixed focal length (f), and aperture diameter (A) is:

$$c=(f*A)/S2=(f2)/(N*S2),$$

where N=f/A is the f-number. Thus, the closer the object, the larger the circle of confusion, and thus the more blurring. This framework can be applied to a smart camera for object detection, such that things that appear to be certain objects but are at unnatural scales can be rejected. For instance, when viewing a video of a cat on a hand-held device, the image of the cat is only a couple of inches long rather than a couple feet long as an actual cat may be. Thus, if the image of the cat takes up the same area in a field of view as a real cat would, it will necessarily be much closer than the real cat would. Such an image will be heavily blurred and will likely not be detected as a "cat." This can be beneficial to distinguish characteristics of a scene, such as by distinguishing between a situation in which a person is talking to another person, as relative to a person watching television on which images of people are being shown.

Turning now to the Figures, FIG. 1 shows an imaging apparatus 106, in accordance with various embodiments of the present disclosure. The apparatus illustrated by FIG. 1 can change imaging modes based on image data collected by the photosensor array 108. Further, the apparatus 106 can provide digital signals indicative of a ratio of pixel intensity values from adjacent sensors of the photosensor array to a processor circuit 124 for further processing.

The apparatus 106, in a number of embodiments, includes a photosensor array 108 and circuitry 110. The photosensor array 108 can include a plurality of sensors (e.g., solid-state photosensors). In some embodiments, the photosensor array 108 is a portion of a photosensor chip. Each sensor provides a signal value for a pixel that is indicative of (e.g., proportional) to an intensity of light detected. In some embodiments, the signal value is indicative, after a given exposure, to the intensity of light detected. The signal values includes, in some embodiments, voltage values. Further, each signal value from the sensors includes an analog signal indicative of a corresponding pixel intensity value.

As illustrated by FIG. 1, the apparatus can include a lens 104 arranged with the apparatus 106 to pass light 102 from a scene to the photosensor array 108. The lens 104, in some embodiments, has a fixed focal length and fixed focus distance, as discussed further herein. The photosensor array 108, in embodiments, can detect light 102 from the scene as passed through the aperture and the lens 104 via the array of sensors.

Further, various types of lenses and/or combinations of lenses may be implemented with and/or in replacement of lens 104. For instance, some embodiments implement specialized lenses with asymmetric bokeh (blur in out-of-focus areas of an image) to facilitate asymmetric subsampling (e.g., subsampling more in the y direction than in the x direction on the photosensor array 108, or vice versa).

In various embodiments, the apparatus 106 includes a readout circuit 109. As is conventional, the readout circuit 109 presents outputs from each sensor (at the corresponding pixel) for subsequent processing, such as through a multiplexer. In some embodiments, the photosensor array 108 as discussed above provides random access readout of signal values corresponding to sensors in the photosensor array 108. The readout circuit 109 captures (e.g., reads) the signal values from the plurality of sensors (e.g., each sensor) of the photosensor array 108 and provides particular signal values to the circuitry 110 (e.g., via a multiplexer, or combination of row decoder and column decoder circuits). The particular signals values provided to a particular part of the circuitry 110 can correspond to adjacent sensors (e.g., a first sensor and a second sensor). An imager can be composed of the photosensor array 108 and the readout circuit 109, in various embodiments, as is conventional in many imagers (e.g., CMOS/photosensor chip).

The circuitry 110 can include analog pixel intensity to ratio converter circuits, which is a type of an analog to digital converter circuit that outputs a digital signal of a ratio of input pixel intensity values. The circuitry 110, as discussed above, is interfaced with the photosensor array 108 through the readout circuit 109. The circuitry 110 receives (e.g., via the readout circuit 109 and a multiplexer) a signal value (e.g. an analog signal) from a plurality of sensors of the array 108. The plurality of sensors can include adjacent sensors, such as two adjacent sensors, in various embodiments. The circuitry 110, in various embodiments, can respond to signal values from the plurality of sensors of the photosensor array by converting a signal indicative of a ratio of pixel intensity values to a digital signal that characterizes an edge of an object corresponding to or associated with the intensity of detected light. The circuitry, in various embodiments, can provide digital signals, each indicative of a ratio of pixel intensity values, for respective sensors of the photosensor array (e.g., adjacent sensors).

A pixel intensity value, as used herein, is an intensity of light captured by a sensor. In some embodiments, the sensors are linear sensors. A linear sensor captures a signal value (e.g., an intensity value and a signal value) that is linearly proportional to the intensity of light. In other embodiments, the sensors are logarithmic sensors. A logarithmic sensor captures a signal value that is proportional to the logarithm of the intensity and an intensity value that is proportional to the intensity of light.

Edges of an object, as used herein, represent differences in illumination captured by the sensors (e.g., where the light intensity changes). Edges are represented, in accordance with the present disclosure, as the ratio of pixel intensity values (e.g., in a digital form). Edges can include surface orientation discontinuities, illumination discontinuities (highlights, shadows), reflectance discontinuities (change in surface material properties, such as color), and depth discontinuities (border between foreground object and background).

In some embodiments, feature descriptor data can be provided from the digital signals via a processor circuit (e.g., DSP 124 and/or processor circuit 126). Feature descriptor data, sometimes referred to as "feature descriptors", in various embodiments, can include the edges of an object formed based on the ratio of pixel intensity values. For example, feature descriptor data can include HOG features, in some embodiments. In various embodiments, the feature descriptor data can be used to form vision feature descriptors. It will be appreciated that while feature descriptors can be visualized, but this visualization is not a part of the feature descriptor itself, and the generation of feature descriptor visualizations is not necessary for object-detection or other computer vision techniques; rather it is simply a means of showing how a given feature descriptor works.

The digital signals indicative of the ratio of pixel intensity values from the plurality of sensors, for ease of reference, is referred to as sensor data 112. The sensor data 112, in various embodiments, is communicated to a DSP 124. The DSP 124 communicates the sensor data 112 to a (computer) processor circuit 126. The processor circuit 126 can be a main processing resource of the apparatus 106, such a cellphone, and/or can be external to the apparatus 106. For example, in some embodiments, the processor circuit 126 is a backend server that communicates with the apparatus 106 via the DSP 124 over a network, such as using wireless communication over the Internet. In a number of embodiments, the apparatus 106 includes a communication circuit to send the sensor data 112 to the processor circuit 126. The communication circuit can, in such embodiments, be a component of the DSP 124. Further, the sensor data 112 can be communicated to a storage/memory 128 and saved.

The processor circuit 126, in various embodiments, can process the sensor data 112. For example, the processor circuit 126 can provide feature descriptor data or feature-description data, provide vision feature descriptors, detect objects, and/or correlate detected objects to physiological data concurrently captured with the detected light intensity, among other applications. The object detection can include a real-time object detection for augmented reality applications. For example, the processor circuit 126 can operate on the digital signals for real-time object detection in an augmented reality application. In various embodiments, the circuitry 110 can capture time-stamped visual information about scene context and this time-stamped visual information can be used for various correlations and/or applications by the processor circuit 126. Further, in some embodiments, the processor circuit 126 processes the sensor data 112 to create a rose-diagram based visualization of HOG features based on the ratios (and/or gradients).

The apparatus 106, in various embodiments, operates in multiple imaging modes when capturing image data. A power management circuit and/or module 122 controls the imaging mode of the apparatus 106. The power management circuit and/or module 122 is in communication, either wirelessly or wired, with the DSP 124. The DSP 124 communicates detected objects to the power management circuit and/or module 122, in some embodiments. The power management circuit and/or module 122 is also in communication, either wirelessly or wired, with a battery 120 of the apparatus to control the imaging mode of the apparatus and/or to identify remaining battery power.

For example, the apparatus 106 operates in a first imaging mode and a second imaging mode. The first imaging mode includes a lower power and captures signal values (e.g., image data) at a lower resolution than the second imaging mode. For example, in the first imaging mode the DSP 124 can receive sensor data 112 from the circuitry 110. In the second imaging mode, the DSP 124 can receive the sensor data 112 from an analog to digital converter 114. The analog to digital converter 114, as discussed further herein, can output digital signals indicative of pixel intensity values from the individual sensors of the photosensor array 108. The lower resolution and lower power of the first imaging mode as compared to the second imaging mode is due to the use of the circuitry 110 providing pixel intensity ratios prior and/or concurrent with converting the analog signals to digital signals. The apparatus 106, in accordance with some embodiments, switches from operating in the first imaging mode to the second imaging mode in response to detecting an object of interest. Thereby, the apparatus 106 can capture signal values continuously and/or for a period of time at the (lower powered) first imaging mode until detecting the object of interest.

For example, while operating in the first imaging mode, the apparatus 106 uses the circuitry 110 to convert analog signals indicative of the ratios of pixel intensity values, for respective sensors of the photosensor array 108, to digital signals. At that time, the apparatus 106 switches to the (higher power) second imaging mode that captures image data at a higher resolution and captures additional image data. While operating in the second imaging mode, in various embodiments, the apparatus 106 provides signal values from the photosensor array 108 to the analog to digital converter 114 via the readout circuit 109, and then to a processor circuit (e.g., DSP 124 and/or other processor circuit) without use of the circuitry 110.

In some embodiments, additional processing can be performed on the signal values (e.g., image data) captured at the higher resolution, such as facial recognition techniques. This can reduce the amount of power used to capture signal values as the second imaging mode is entered in response to detecting the object using the first imaging mode (e.g., the lower power imaging mode).

In some embodiments, as discussed further herein, instead of and/or in addition to the two imaging modes, a different apparatus can be used to capture further image data in response to detecting an object. The apparatus 106, in such embodiments, can communicate with the different apparatus to cause the different apparatus to capture image data, as further discussed in connection with FIG. 5. In embodiments, the detected object is detected using the digital signals indicative of the ratio of pixel intensity values provided by the circuitry 110 and are thereby detected using less power than if the different apparatus were used. That is, the DSP 124 can receive signal data from the circuitry 110 when the apparatus is operated and can receive signal data from individual imaging sensors via the analog to digital converter 114 when the different apparatus is operated.

Apparatus in accordance with the present disclosure can include additional and/or fewer features than illustrated by FIG. 1. For example, in some embodiments, as illustrated by FIG. 1, the apparatus 106 includes an analog to digital converter 114 that is separate from the circuitry 110. The analog to digital converter 114 is interfaced with the photosensor array 108 through the readout circuit 109 to capture outputs (e.g., image data) from the photosensor array 114. The analog to digital converter 114 converts the image data to a digital signal and inputs the digital signal to at least one of the DSP 124, an auto exposure circuit 116, and an autofocus circuit 118. The auto exposure circuit 116 can adjust the exposure of the photosensor array 108 based on outputs from the photosensor array 108 (e.g., via readout circuit 109). The autofocus circuit 118 can adjust the focus of the lens 104 based on outputs from the photosensor array 108. The adjustment, in various embodiments, can be in response to a detected object.

The circuitry 110, in accordance with embodiments of the present disclosure, includes a plurality of analog pixel intensity ratio to digital converter circuits arranged to receive a plurality of inputs from the photosensor array 108 via a readout circuit 109. The readout circuit 109, in some embodiments, is arranged with the photosensor array 108 to receive (e.g., read) outputs from the sensors of the array (e.g., analog signal values) and provide (e.g., via a multiplexer or row decoder and column decoder circuits) particular outputs to particular portions (e.g., circuits) of the circuitry 109. As discussed further herein in connection with FIG. 2B, the circuitry is configured to respond to signal values (e.g., outputs) from a plurality of sensors. In some embodiments, the circuitry 110 is configure to receive (e.g., readout) an output of a first sensor and an output of a second sensor. The first and second sensor, in some embodiments, are adjacent sensors. In certain embodiments, the circuitry 110 can be arranged to provide data from a comparison between every N sensor in the horizontal and/or vertical direction, where N is an integer greater than one. This can result in only every "N" pixel in the vertical and/or horizontal direction being used to generate the image data. In this manner, the spatial resolution can be further reduced because certain pixels are not being used. Accordingly, while the term "adjacent" is used for ease of discussion, pixels that are not used are not considered in determining adjacency.

Figure 2A:
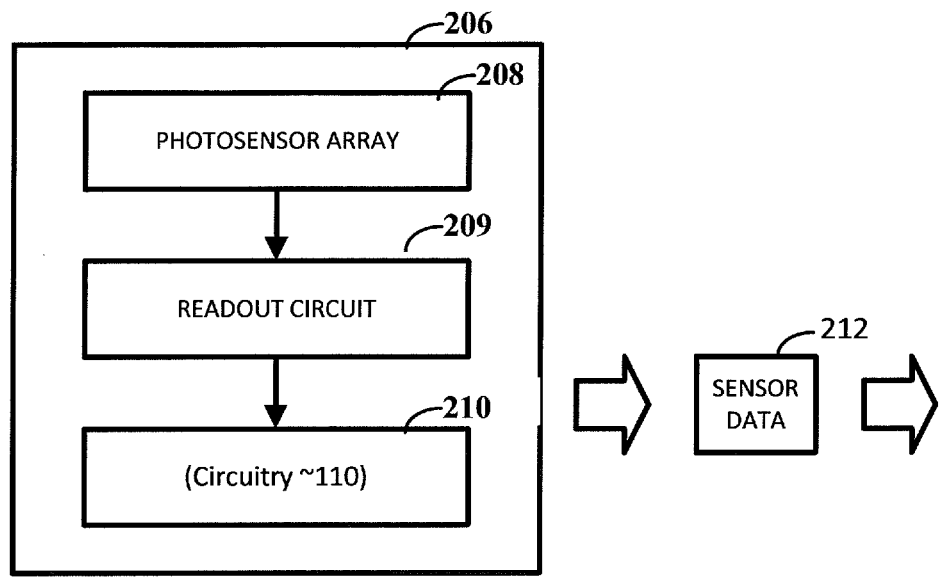
FIG. 2A shows an example of an imaging apparatus, in accordance with various embodiments of the present disclosure.

FIG. 2A shows an imaging apparatus 206, in accordance with various embodiments of the present disclosure. As previously discussed, the imaging apparatus 206 includes a photosensor array 208, a readout circuit 209, and circuitry 210.

The imaging apparatus 206, in various embodiments, provides sensor data 212. For example, in some embodiments the imaging apparatus 206 provides signals (e.g., analog signals) indicative of a ratio of pixel intensity values from adjacent sensors without first performing or during performance of an analog to digital conversion on the individual analog pixel intensity values. The photosensor array 208 can provide signal values from light rays that is based upon an intensity of light detected. For instance, in some embodiments, the sensor can include linear pixel sensors and can provide signal values that are linearly proportional to the intensity of light detected. The readout circuit 209 can provide the signal values to the circuitry 210, among other circuits, as previously discussed in connection with FIG. 1. The circuitry 210 can respond to the signal values by providing a signal indicative of a ratio of pixel intensity values of adjacent sensors. The circuitry 210 can convert the signal indicative of the ratio of pixel intensity values of adjacent sensors from an analog signal to a digital signal.

Figure 2B:
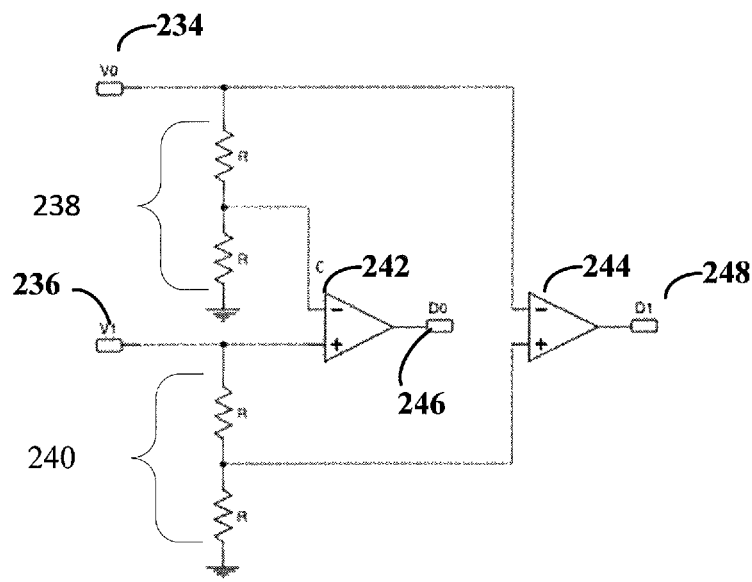
FIG. 2B shows an example of circuitry, in accordance with various embodiments of the present disclosure.

FIG. 2B shows an example of a circuitry in accordance with various embodiments of the present disclosure. In some embodiments, the circuitry illustrated by FIG. 2B can include a circuit among a plurality of circuits forming the circuitry. The circuitry, in various embodiments, includes an analog pixel intensity to ratio digital converter circuit that outputs a digital signal representative of the ratio of pixel intensity values from a plurality of adjacent sensors (e.g., two adjacent sensors) from input analog signals indicative of corresponding pixel intensity values. Further, the circuitry, as illustrated by FIG. 2B can include a comparison circuit that compares the values of two input analog signals indicative of pixel intensity values and outputs a digital signal indicative of a ratio of the two pixel intensity values.

As illustrated by FIG. 2B, the circuitry includes a first input 234 connected to an output (e.g., V0) of a first sensor of the photosensor array. A second input 236 of the circuitry is connected to an output (e.g., V1) of a second sensor of the photosensor array. The output of the first sensor and the second sensor can include signal values from the respective sensors. The output of the first sensor and the second sensor can include analog signals indicative of corresponding pixel intensity values of the first sensor and the second sensor.

The circuitry, in some embodiments, includes two comparators 242, 244 that can convert signals indicative of a ratio of the output of the first sensor and the output of the second sensor to a digital signals that characterizes at least one edge of an object corresponding to or associated with the intensity of light detected. The first comparator 242 can compare a percentage of the output of the first sensor to the output of the second sensor. The second comparator 244 can compare a percentage of the output of the second sensor to an output of the first sensor. The first and second comparator 242, 244 can output digital signals 246, 248 (e.g., D0, D1), in various embodiments.

The circuitry includes, in some embodiments, a first divider circuit 238 and a second divider circuit 240. The first divider circuit 238 can change the output of the first sensor to produce the percentage of the output of the second sensor. For example, the first divider circuit 238 can divide the output of the first sensor (e.g., divide the signal value of the first sensor by a factor of two). In some embodiments, the first divider circuit 238 includes a first resistor divider network connected to the first input 234 of the circuit and an input of the first comparator 242.

The second divider circuit 240 can change an output of the second sensor to produce the percentage of the output of the second sensor. The second divider circuit 240 can divide the output of the second sensor (e.g., divide the signal value by a factor of two). In some embodiments, the second divider circuit 240 includes a second resistor divider network connected to the second input 236 of the circuit and an input of the second comparator 244.

The two comparators 242, 244 can provide a plurality of outputs values (e.g., digital outputs 246, 248) based on the output from the first and second sensors. For example, the two comparators can each output two different digital signal values (e.g., zero and one) based on the ratio of the output of the first sensor and the output of the second sensor. The ratio of the output of the first sensor and the output of the second sensor includes a ratio of pixel intensity values from two adjacent sensors, as previously discussed. Below is an example of using two bits to represent the three possible ranges for the ratio values of V0/V1 assuming both divider circuits divide input signals by a factor of two:

(V0/V1<0.5), 0.5<(V0/V1)<2, and (V0/V1>2).

The three possible ranges result in the four different output digital signal values by the comparators 242, 244. For example, Table 1 illustrates the possible output digital signals 246, 248 and the corresponding ratio values:

TABLE 1

Digital Output Signals v. Corresponding Ratio of Pixel Intensity Values

| D0D1 | Ratio of Pixel Intensity Values |
|---|---|
| 00 | (V0/V1) > 2 |
| 01 | N/A |
| 10 | 0.5 < (V0/V1) < 2 |
| 11 | (V0/V1) < 0.5 |

For example, assume the divider circuits 238, 240 divide the signal values by a factor of two. An analog output signal from the first sensor can be divided by a factor of two by the first divider circuit 238 and input to a first input of the first comparator 242. An output analog signal from the second sensor can be input to a second input of the first comparator 242. If the analog signal input to the first input (e.g., the signal value V0 of the first sensor that is divided by a factor of two) is greater than the analog signal input (e.g., the signal value V1 of the second sensor) to the second input of the first comparator 242, the first comparator 242 outputs a digital signal of zero (e.g., D0 346 is zero). If the analog signal input to the first input is less than the analog signal input to the second input of the first comparator 242, the first comparator 242 outputs a digital signal of one (e.g., D0 is one).

Using the above example, an output analog signal from the first sensor can be input to a first input of the second comparator 244. An output analog signal from the second sensor can be divided by a factor of two by the second divider circuit 240 and input to a second input of the second comparator 244. If the analog signal input to the first input (e.g., the signal value V0 of the first sensor) is greater than the analog signal input to the second input (e.g., the signal value V1 of the second sensor divided by a factor of two) of the second comparator 244, the second comparator 244 outputs a digital signal of zero (e.g., D1 is zero). If the analog signal input to the first input is less than the analog signal input to the second input of the second comparator 244, the second comparator 244 outputs a digital signal of one (e.g., D1 is one).

Continuing with the above example, output digital signals from the two comparators 242, 244 of D0D1 (0,0) can indicate that the ratio of pixel intensity values of the first sensor and the second sensor (first sensor/second sensor) is greater than two. That is, the first sensor has an intensity value that is greater than twice the intensity value of the second sensor. Output digital signals of D0D1 (1,1) can indicate that the ratio of intensity values of the first sensor and the second sensor is between 0.5 and two. Further, output digital signals of D0D1 (1,1) can indicate that the ratio of pixel intensity values of the first sensor and the second sensor is less than 0.5. An output digital signal of D0D1 (0,1) may not available as this can indicate a ratio of pixel intensity values of (V0/V1) is greater than 2 as output by the first comparator 242 and that the ratio of pixel intensity vales of (V0/V1) is less than 0.5 as output by the second comparator 244.

Although the present embodiment illustrates using two bits and divider circuits that divide by a factor of 2, embodiments are not so limited. For example, additional bits and a variety of different divider values can be used in accordance with the present disclosure.

Figure 3:
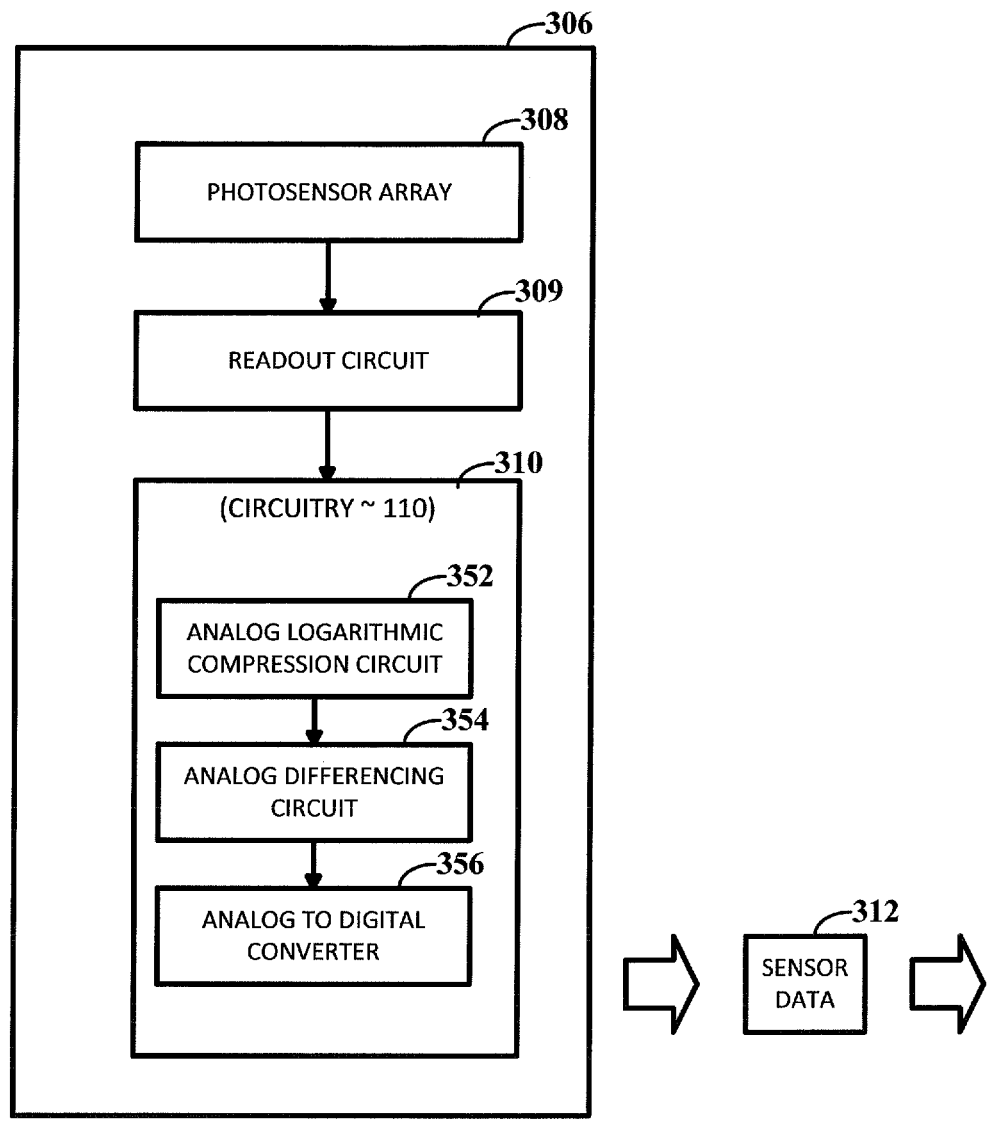
FIG. 3-4 show examples of imaging apparatuses, in accordance with various embodiments of the present disclosure.
Figure 4:
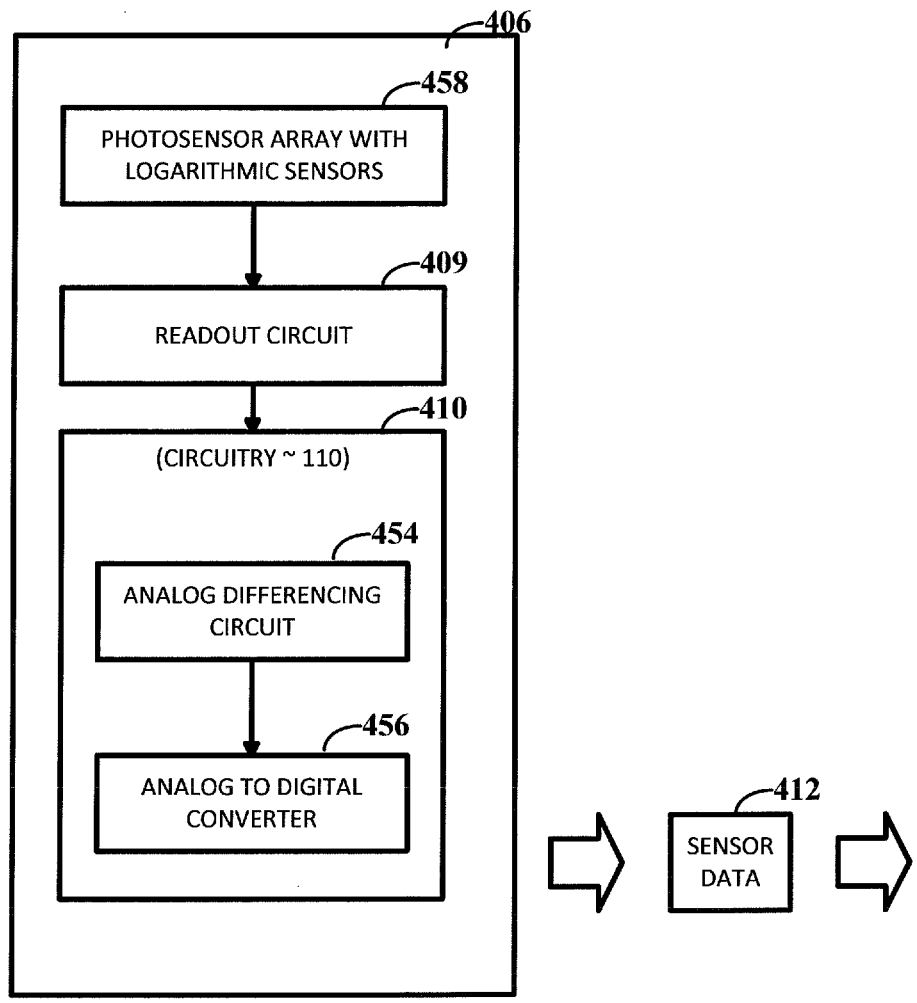

Further, in accordance with various embodiments, circuitry can include a variety of circuits and/or features not illustrated by FIG. 2B. For example, the circuitry illustrated by FIG. 2B can further include an analog logarithmic compression circuit, as further discussed herein. The analog logarithmic compression circuit can be connected to the output of the first sensor and an input of the first comparator 242, and connected to the output of the second sensor and an input of the second comparator 244, and configured and arranged to output analog signal values of a logarithm of the output of the first sensor and the output of the second sensor to the respective comparators. In some embodiments, the circuitry can provide an analog gradient output indicative of a difference between logarithmically compressed signal values from the first and the second sensors corresponding to respective pixels of interest, as discussed further herein. FIG. 3-4 show examples of imaging apparatuses with circuitry containing additional circuits/features, in accordance with various embodiments of the present disclosure.

As illustrated by FIG. 3, an imaging apparatus 306 in accordance with the present disclosure includes a photosensor array 308, a readout circuit 309, and a circuitry 310. The readout circuit 309 is arranged with the photosensor array 308 to provide signal values from the sensors to the circuitry 310.

In various embodiments, the circuitry 309 (e.g., an analog pixel intensity ratio to digital converter circuit) includes an analog logarithmic compression circuit 352, an analog differencing circuit 354, and an analog to digital converter 356. The analog logarithmic compression circuit 352 can output a logarithm of an output (e.g., signal values readout from the readout circuit 309) of the two sensors, in some embodiments. For example, the signal values from two sensors is input to the analog logarithmic compression circuit 352 (e.g., from the readout circuit 309) and output is a logarithm of the values. The logarithm of the values can be a compressed value as compared to the input. However, embodiments in accordance with the present disclosure are not so limited and can include outputs/signal values from more than two sensors.

In various embodiments, the output from the analog logarithmic compression circuit 352 is input to an analog differencing circuit 354. An analog differencing circuit 354 can output a difference of the inputs (e.g., a logarithm of the output of the first sensor and the output of the second sensor). An analog differencing circuit 354 can be coupled to receive logarithmically compressed outputs of the analog logarithmic compression circuit 352, and provide an output that is the difference of the inputs. This output of the analog differencing circuit 354, which is the difference (or gradient) of logarithms, can be coupled to an analog to digital converter 356 which digitizes the output. The digital signal can be provided as sensor data 312 and is indicative of the gradient collected from a scene.

In some examples, the difference includes a ratio. Alternatively, the difference includes an (analog) gradient output indicative of a difference between logarithmically compressed signal values.

In accordance with some embodiments, the circuitry 310 includes an analog to digital converter 356. The analog to digital converter 356 can convert an analog input (e.g., the difference of the output of the first sensor and the output of the second sensor) to a digital signal. The analog difference circuit 354 and the analog to digital converter 356, in some embodiments, include the circuitry as illustrated by FIG. 2B.

In some embodiments, an analog exponential amplifier circuit is coupled between the analog differencing circuit 354 and the analog to digital converter 356. The exponential amplifier circuit can take the difference of logarithms (which equals the logarithm of illuminance ratio) as an input, and outputs an illuminance ratio, as discussed further herein.

Various aspects are directed to addressing challenges to collecting gradient information, such as those discussed above, by using characteristics of a ratio of illuminance between a diffuse white and a diffuse black surface as being about constant regardless of the intensity of the light source (illumination invariant). The logarithm of the linear pixel intensity values can be taken, and the difference of logarithms can be used to compute a value that is the logarithm of the ratio of illuminances. In connection with one or more embodiments, the difference of logarithms calculated between a diffuse white and black surface outdoors is equal to the difference of logarithms calculated between a diffuse white and black surface indoors, despite the different lighting sources. This difference of logarithms can be converted to a digital signal and used to provide a resolution in gradient intensity that is not dependent on the dynamic range of the scene. With such embodiments, gradients are detected for relatively high dynamic range scenes without necessarily implementing higher bitdepths. Such embodiments facilitate the use of low-power analog to digital converters.

In some embodiments, an upper bound on the maximum ratio of illuminances that is captured can be set based on the illuminance ratio between diffuse white and diffuse black surfaces for a given light source (e.g., about 100). Such embodiments capture useful edge information that, for computer applications such as object detection, is related to differences in the absorption spectra of a scene rather than differences in lighting sources (such as shadows).

The sensor data 312, in various embodiments, is used to detect an object. In some embodiments, objects of interest and the background are assumed to have the same source of illumination (e.g., sun, indoor lamps), and the maximum gradient corresponds to a factor of 100 (e.g., black vs. white surface). The effect of objects that have different sources of illumination than their backgrounds is suppressed by applying a truncation (or clipping) function to the gradient calculation, such that the maximum gradient allowed corresponds to a ratio of 100:1, and everything above this gets mapped to 100. Certain embodiments are directed to a differential logarithmic amplifier that takes the difference of the logarithmic compressed values in such a way that clips. Further, a logarithmic gradient angle is used in other embodiments.

The signal values (e.g., provided via the readout circuit 309 and a multiplexer) can be used in a variety of manners. In various embodiments, the signal values are logarithmically compressed and the logarithmically compressed signal values are processed via a differencing circuit that provides a gradient output that is a difference of the logarithmically compressed signal values. The gradient output can then be used to ascertain the characteristics of the scene, such as for detecting objects. In some embodiments, gradient information is ascertained using a logarithm of signal values (e.g., voltage values) from the sensors and difference of logarithms can be provided (e.g., to represent high dynamic range scenes with relatively fewer bits/less data).

The apparatus 406 illustrated in FIG. 4 includes a photosensor array with logarithmic sensors 458 in accordance with various embodiments. As previously discussed, the signal values of logarithmic pixel sensors can be logarithmically proportional to the light detected by the sensors. In such embodiments, an analog logarithmic compression circuit, such as illustrated by FIG. 3, may not be included in the circuitry 410.

As illustrated by FIG. 4, the apparatus 406 includes a photosensor array with logarithmic sensors 458, a readout circuit 409, and circuitry 410.

As the signal values provided from the sensors 458 are logarithmically compressed during capturing, in some embodiments, the circuitry 410 includes an analog differencing circuit 454 and an analog to digital converter 456. In some embodiments, the analog differencing circuit 454 and the analog to digital converter 456 include a circuitry as illustrated by FIG. 2B. The signal values provided from the sensors (e.g., two sensors) can be input to the analog differencing circuit 454, which outputs a difference and/or a gradient between the two signal values. The difference (or gradient) can be input to the analog to digital converter 456 and converted to a digital signal. The digital signal can be output as sensor data 412.

Figure 5:
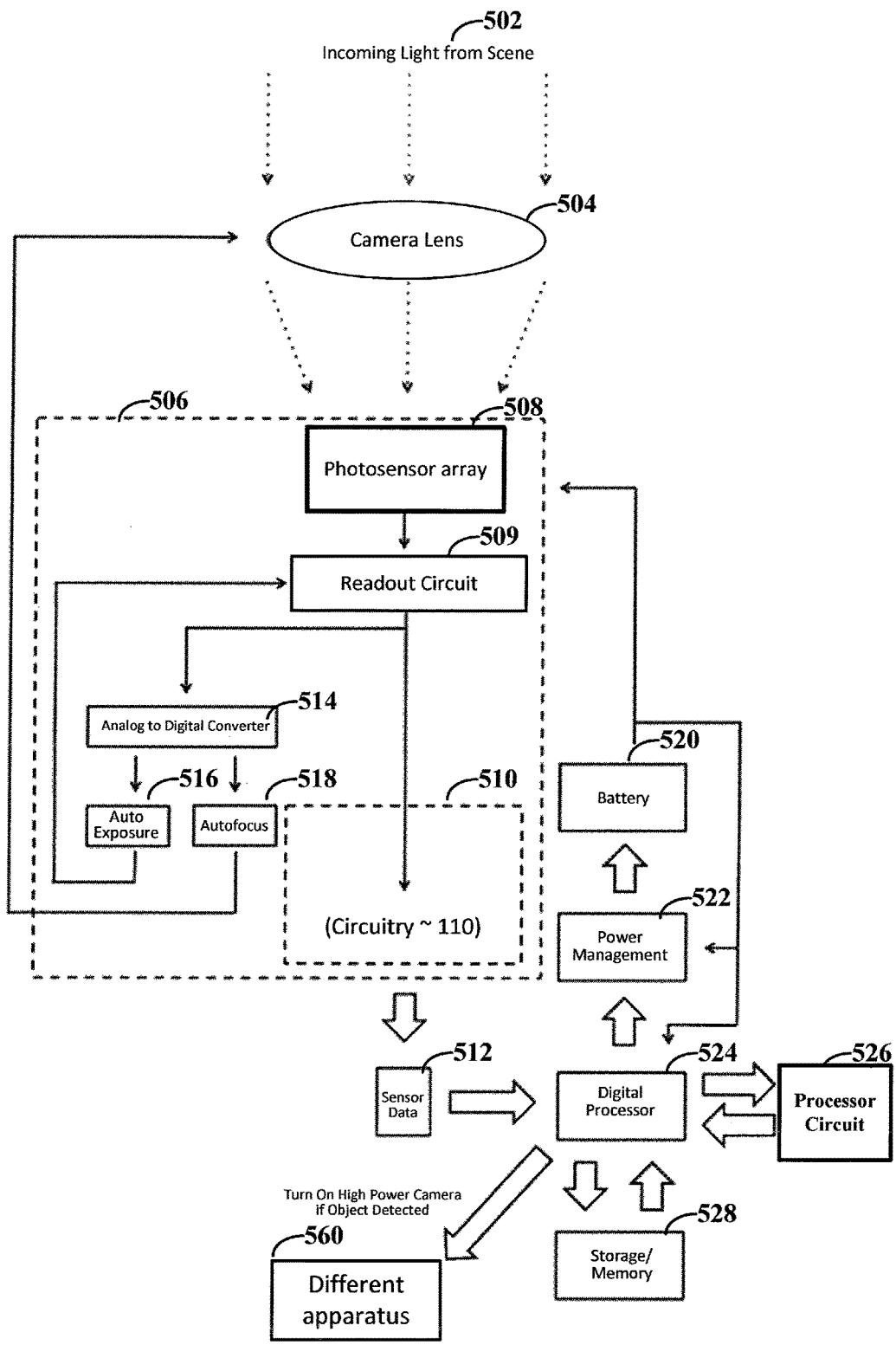
FIG. 5 shows an example of an imaging apparatus, in accordance with various embodiments of the present disclosure.

FIG. 5 shows an imaging apparatus 506, in accordance with various embodiments of the present disclosure. The imaging apparatus 506 illustrated by FIG. 5 includes the same imaging apparatus illustrated by FIG. 1, in various embodiments, however, embodiments are not so limited. The apparatus 506 illustrated by FIG. 5 can switch operation from the apparatus 506 to a different apparatus 560 based on image data collected by the photosensor array 508, in accordance with various embodiments.

The apparatus 506 includes a photosensor array 508, a readout circuit 509, and circuitry 510. In various embodiments, the apparatus 506 includes a lens 504 arranged with the apparatus to pass light 502 from a scene to the photosensor array 508.

The circuitry 510 of the apparatus includes, in some embodiments, a plurality of analog pixel intensity ratio to digital converter circuits and/or comparison circuits (e.g., as illustrated by FIG. 3B). The circuitry 510, in various embodiments, can receive signal values provided from a plurality of adjacent sensors of the photosensor array 508 via a readout circuit 509, provide a signal indicative of a ratio of pixel intensity values from the plurality of adjacent sensors based on the signals values, and convert the signal indicative of the ratio of pixel intensity values to a digital signal. The signal of the ratio of pixel intensity values can, for instance, include an analog signal.

The circuitry 110 can provide a plurality of digital signals, each indicative of a ratio of pixel intensity values, for respective sensors of the photosensor array. The respective sensors, in various embodiments, can include adjacent sensors corresponding to pixels of interest. The pixels of interest can include a portion of the plurality of pixels and/or all of the pixels.

The signal values each include an analog signal indicative of a corresponding pixel intensity value of one of the plurality of adjacent sensors, for example. The signal values can be from two adjacent sensors, in some embodiments, and/or can be provided to the respective circuitry by the readout circuit 509, as previously discussed. The digital signals can be provided as sensor data 512 to a DSP 524 and/or a processor circuit 526, as previously discussed. In various embodiments, the sensor data 512 can be communicated to a storage/memory 528 and saved.

The processor circuit 526, in various embodiments, processes the sensor data 512. For example, the processor circuit 526 can detect objects, and/or correlate detected objects to physiological data concurrently captured with the detected light, among other applications.

The apparatus 506, in various embodiments, can operate in a first imaging mode (e.g., a low-power mode) to capture image data and detect objects. A power management circuit and/or module 522 controls the imaging mode of the apparatus 506. The power management circuit and/or module 522 is in communication, either wirelessly or wired, with the DSP 524. The DSP 524, in some embodiments, can communicate a detected object and/or an indication to continuously, and/or for a period of time, capture image data. The power management circuit and/or module 522 is also in communication, either wirelessly or wired, with a battery 520 of the apparatus to control the imaging mode of the apparatus and/or identify a battery power remaining.

In response to detecting an object, a different apparatus 560 is operated instead of and/or in addition to the apparatus, in some embodiments. For example, the apparatus 506 switches the image data capturing operation from the apparatus 506 to the different apparatus 560. The different apparatus 560, for example, operates at a higher power and captures image data at a higher resolution than the apparatus 506. The apparatus 506 operates at a lower power and a lower resolution due to the use of the circuitry 510. That is, the object can be detected using the digital signals indicative of the ratio of pixel intensity values, which can use less power than if the different apparatus 560 were used. While operating the different apparatus 560, the different apparatus 560 provides signal values from a photosensor array of the different apparatus 560 to an analog to digital converter circuit of the different apparatus 560 via a readout circuit, and then to a processor circuit (e.g., DSP 524 and/or other processor circuits) without use of similar circuitry to the circuitry 510. For example, the DSP 524 can receive signal data 512 including digital signals indicative of ratios of pixel intensity values from the circuitry 510 when the apparatus 506 is operated and receive signal data 512 including digital signals indicative of the pixel intensity values from individual imaging sensors via the analog to digital converter of the different apparatus 560 when the different apparatus 560 is operated.

In some embodiments, additional processing can be performed on the image data captured at the higher resolution, such as using facial recognition techniques. This can reduce the amount of power used to capture image data as the different apparatus 560 is operated in response to detecting the object using the apparatus 506 (e.g., in a lower power mode than the different apparatus 560 is operated at).

Apparatus in accordance with the present disclosure can include additional and/or fewer features than illustrated by FIG. 5.

Figure 6:
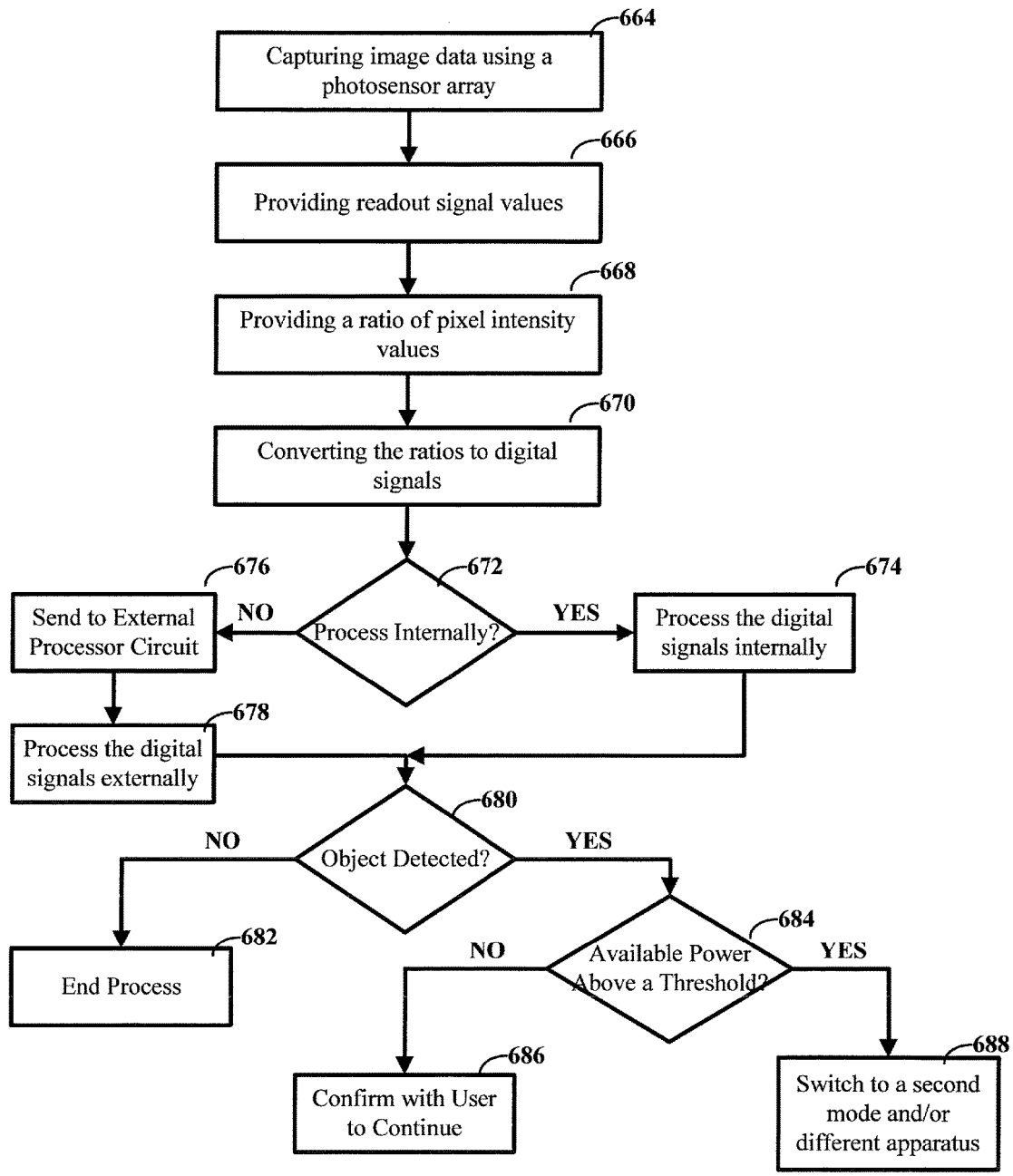
FIG. 6 shows a flow diagram of an example process, in accordance with various embodiments of the present disclosure.

FIG. 6 shows a flow diagram of an example process, in accordance with various embodiments of the present disclosure. A variety of processes can be performed using an apparatus as illustrated in the above Figures, such as the apparatus illustrated in FIG. 1-5.

At block 664, the process includes capturing image data from light rays using a photosensor array. At block 666, the process includes providing signal values from a plurality of sensors of an array of sensors to circuitry of the apparatus. The signal values, in various embodiments, are provided using one or more readout circuits interfaced with the photosensor array and the circuitry. Further, the signal values include analog signals indicative of corresponding pixel intensity values of the array of sensors.

At block 668, the process includes providing an analog signal indicative of a ratio of pixel intensity values from adjacent sensors of the plurality of sensors based on the signal values. And, using the circuitry, at block 670, the process includes converting the analog signal indicative of the ratio of pixel intensity values to a digital signal that characterizes at least an edge of an object corresponding to or associated with the intensity of detected light, as previous discussed. The circuitry can, for example, be configured to provide a plurality of digital signals, each indicative of a ratio of pixel intensity values, for respective sensors of the photosensor array.

In some embodiments, although not illustrated by FIG. 6, the circuitry can be used to create a variety of outputs. For example, the process in some embodiments includes logarithmically compressing, using the circuitry, the signal values, processing the logarithmically compressed signal values via the circuits that provide a gradient output that is a difference of the logarithmically compressed signal values, and using the gradient output to ascertain the characteristics of the scene. In other embodiments, the digital signals indicative of the ratio of pixel intensity values are used to ascertain gradient information using a logarithm of the digital signal values from the sensors and taking a difference of logarithms.

In other embodiments, the circuitry can be used to logarithmically compress the signal values, providing an analog gradient output indicative of a difference between logarithmically compressed signal values of the sensors, and converting the analog gradient output to a digital signal. The processor circuit, in such embodiments, detects objects in the scene using the analog gradient output.

As illustrated by FIG. 6, various processes include detecting, using a processor circuit, an object using the digital signals. The processing, in accordance with various embodiments, is performed internally to the apparatus or externally. Thereby, at block 672, the process includes determining whether to process internally or externally to the apparatus. For instance, in accordance with various embodiments, the apparatus determines where to process the digital signals. The determination can be automatic, rule based, and/or depend on a battery power remaining (e.g., whether a battery of the apparatus is above and/or below a threshold power remaining), among other determinations.

As an example, a DSP of the apparatus can receive digital signals and communicate with a power management circuit and/or module. The power management circuit and/or module can identify how much power is remaining on a battery of the apparatus. The power management circuit and/or module can determine if the power remaining is above or below a threshold and determine whether to process the digital signals internally and/or externally. Further, the power management circuit can communicate the determination to the DSP and the DSP can communicate the digital signals to a processor circuit that is internal to the apparatus or processor circuit that is external to the apparatus.

That is, in response to determining to process internally, at block 674, the process includes processing the digital signals internally. In response to determining to not process internally, at block 676, the digital signals are sent to a processor circuit that is external to the apparatus using a wireless or a wired communication, and, at block 678, the digital signals are processed. In various embodiments, processing the digital signals includes detecting an object, using a processor circuit, based on at least one of the digital signals.

At block 680, a determination is made as to whether an object is detected. In response to not detecting an object, at block 682, the process is complete. In response to detecting an object (e.g., using a processor circuit) using the digital signals, in some embodiments, a determination is made at block 684 on whether the remaining power of the battery is above (or below) a threshold. In response to the power remaining being below the threshold, at block 686, in various embodiments, the apparatus confirms with the user to continue. In this manner, a user can determine whether to use additional battery power for the application.

In response to the power remaining being above the threshold, at block 688, the process in some embodiments includes switching the apparatus from operating in a first imaging mode to a second imaging mode and capturing additional image data. The first imaging mode includes a lower imaging mode and the apparatus in the first imaging mode captures image data at a lower resolution than when in the second imaging mode.

Alternatively and/or in addition, at block 688, the process includes operating a different apparatus in response to the detected object. Image data can be captured by the different apparatus and digital signals indicative of pixel intensity values can be provided to the processor circuit. The apparatus operates in the first imaging mode (e.g., at a lower power and captures image data a lower resolution than the different apparatus) and the different apparatus operate in the second imaging mode. In either embodiment, the image data captured using the higher power and higher resolution than used previously is used to perform more advanced techniques using the processor circuit and the digital signals indicative of the pixel intensity values, such as facial recognition techniques.

For example, in a first imaging mode a DSP can receive sensor data from the circuitry (e.g., analog pixel intensity ratio to digital converter circuits/comparison circuits). The sensor data received by the DSP from the circuitry can include digital signals indicative of the ratio of pixel intensity values. In a second imaging mode, the DSP can receive sensor data from the individual sensors via an analog to digital converter circuit. The sensor data received by the DSP from an apparatus operating in the second imaging mode can include digital signals indicative of pixel intensity values from each of the individual sensors. The apparatus may consume less power when operating in the first imaging mode than the second imaging mode because the ratio of pixel intensity values, converted by the apparatus to digital signals, can include less data than the pixel intensity values from the sensors. That is, when operating in the second imaging mode, the apparatus may convert more information from analog signals to digital signals and may consume more power due, at least in part, to the additional data to convert.

Alternatively and/or in addition, in some embodiments, the process includes correlating physiological data concurrently captured with the image data, to the detected objects. The physiological data is collected, in various embodiments, using an additional device, such as a wearable wrist device. In such embodiments, the circuitry captures time-stamped visual information about scene context so that the image data can be correlated with physiological data.

Experimental Results/Additional Detailed Embodiments

Figure 7:
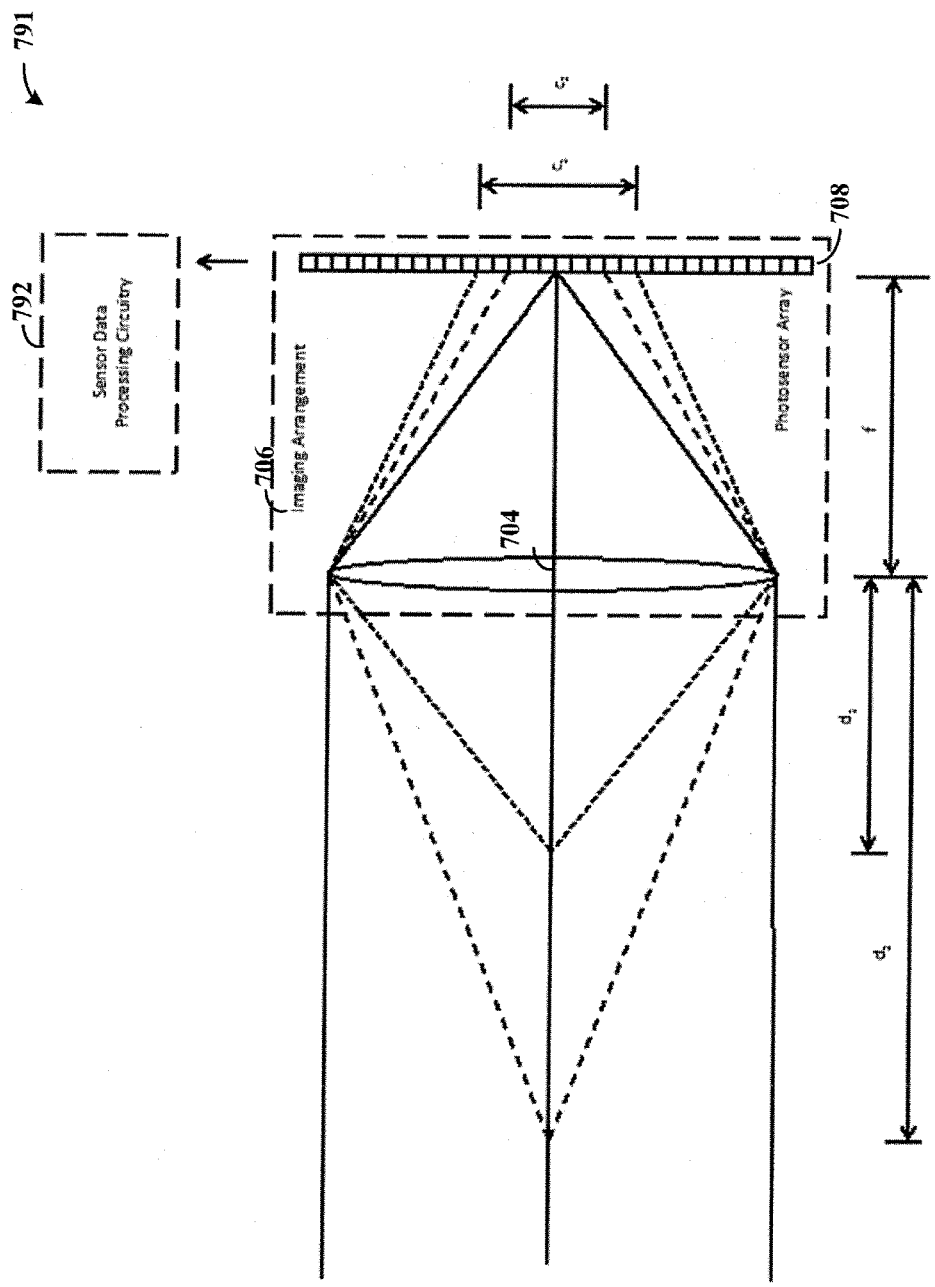
FIG. 7 shows an example of an imaging apparatus, in accordance with an example embodiment of the present disclosure.

FIG. 7 shows an imaging apparatus 791, in accordance with another example embodiment of the present disclosure. The apparatus 791 includes an imaging arrangement 706, including a lens 704 and a photosensor array 708. An output of the photosensor array 708 is coupled to sensor data processing circuitry 792. The sensor data processing circuitry 792 may, for example, be implemented using approaches and/or algorithms as discussed herein. Some embodiments are directed to one or more portions of the apparatus 791, such as to the imaging arrangement 706, to the data processing circuitry 792, or to a combination of components such as the photosensor array 708 and the sensor data processing circuitry 792. Further, various types of lenses and/or combinations of lenses may be implemented with and/or in replacement of lens 704. For instance, some embodiments implement specialized lenses with asymmetric bokeh (blur in out-of-focus areas of an image) to facilitate asymmetric subsampling (e.g., subsampling more in the y direction than in the x direction on the photosensor array 708, or vice versa).

In some implementations, a focus distance of the apparatus 791 is set at infinity by placing the photosensor array 708 one focal length behind the lens 704. The equation for a circle of confusion diameter in the image plane (c) vs. object distance (d), assuming an infinite focus distance, fixed focal length (f), and fixed aperture diameter (A) is:

$$c=(f*A)/d.$$

Thus, the circle of confusion diameter is inversely proportional to object distance, and closer objects are blurred more than distant ones.

FIG. 7 shows ray diagrams for points located at three distances from the lens: d1 (short dashes), d2 (longer dashes), and infinity (solid line). A point at distance infinity is in focus and mapped to a point on the photosensor array. Points at distances d1 and d2 are out of focus and mapped to circles of confusion with diameters c1 and c2, respectively. As related to the previously-described equation for the circle of confusion diameter, FIG. 7 illustrates that when d2>d1, it is implied that c2<c1, such that closer points create larger circles of confusion. This approach is used to estimate the distance of objects and/or other characteristics thereof, as represented in the circle of confusion. Using fixed focus distance and fixed focal length (f), the equation for object distance vs. object image size is:

$$H\_i=(f*H\_o)/(d-f),$$

where H_o is object height, H_i is object image height, and d is object distance. Where the object distance (d) is much larger than the focal length (f), an approximation as follows is used:

$$H\_i{\sim}=H\_o*(f/d).$$

Thus, for a given object, image size is also approximately inversely proportional to object distance, so closer objects will create larger images than distant ones.

The relationships described above with regard to the circle of confusion (c) and object image height (H_i) are used to capture an image of an object of a given size at a relatively constant spatial resolution. Pixels of the photosensor array 708 are point-sampled to capture the image of the object with suppressed aliasing effects, and at various object distances. Point sampling may, for example, be implemented by reading out every pixel with coordinates (x,y)

such that x and y are both divisible by some integer n which is greater than 1. Larger values of n are used to effect greater degrees of subsampling.

Figure 8:
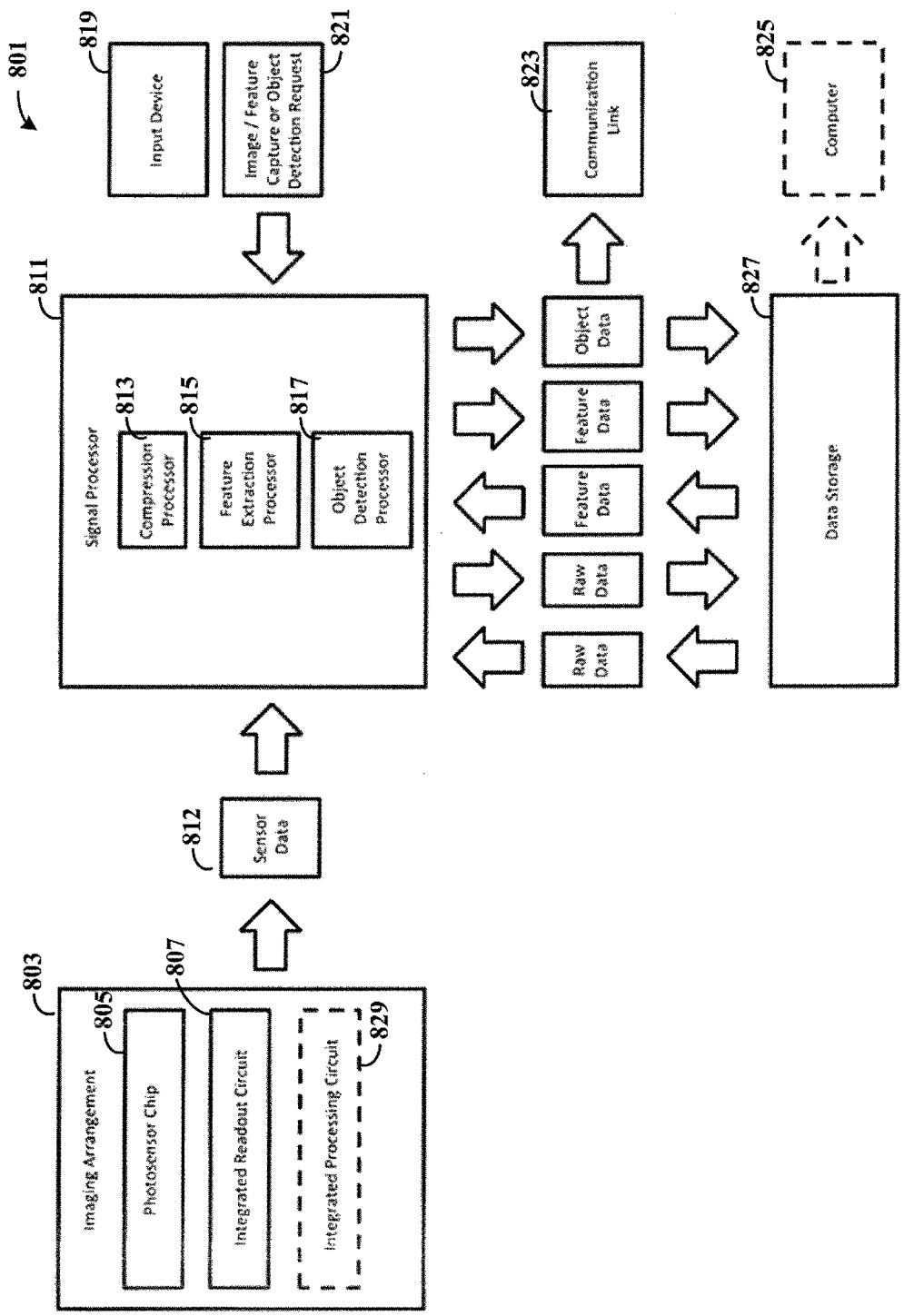
FIG. 8 is a data-flow diagram showing an approach to processing images in connection with one or more example embodiments of the present disclosure.

FIG. 8 is a system 801 and data-flow type diagram showing approaches to processing images, in connection with one or more embodiments, as may be implemented for low-power object detection. An image arrangement 803 collects image data using a photosensor chip 805 in a manner similar, for example, to the photosensor array 708 shown in FIG. 7 and described above, and may be implemented as such. The image arrangement 803 also includes integrated readout circuitry 807, and in some instances, integrated processing circuitry 829 bearing processing circuitry to prepare collected image data for transfer.

Sensor data 812 created at the image arrangement 803 is passed to a signal processor circuit 811, which includes a compression processor circuit 813, a feature extraction processor circuit 815 and an object detection processor circuit 817. Each of these processors may be selectively implemented separately or functionally with a common processor circuit, depending upon the application. The signal processor circuit 811 is optionally implemented in a common device or component with the image arrangement 803, such as on a common circuit and/or in a common image device (e.g., a camera).

The system 801 responds to an input from input device 819, such as a pushbutton on a camera, video camera, or mobile device, by carrying out imaging functions. For instance, input device 819 may send an image capture, feature capture, or object detection request 821 to the signal processor circuit 811 requesting, for example, the capture of a particular image at a specified resolution.

In response to the image capture request or as otherwise directed, the signal processor circuit 811 uses the sensor data 812 captured by the image arrangement 803 to generate processed sensor data. In some applications, the compression processor circuit 813 is implemented to generate compressed raw data for transfer to a data storage circuit 827 (e.g., memory). Such raw data is then selectively processed at the signal processor circuit 811, at other processing device coupled via communication link 823, and/or at an external computer 825. Such external devices may implement feature extraction processing (e.g., feature descriptor data or feature-description data) and/or object detection processing (e.g., vision feature descriptors) such as via processing implemented with the feature extraction processor circuit 815 or object detection processor circuit 817.

In certain applications, the feature extraction processor 815 is implemented to process the sensor data 812 received at the signal processor circuit 811 to extract meaningful features for object detection (e.g., Histogram of Oriented Gradient features). Feature data (e.g., feature descriptor data or feature-description data) created with the feature extraction processor circuit 815 is sent to the data storage circuit 827, and/or to communication link 823 for use in a variety of applications such as in streaming feature data or otherwise sending feature data to a remote location. The feature data created with the feature extraction processor circuit 815 can also be sent to the object detection processor circuit 817.

In some applications, the object detection processor circuit 817 receives feature data from the feature extraction processor circuit 815 or data storage circuit 827, and performs object detection (for example, using a sliding window classifier) to generate object data (e.g., from vision feature descriptors). This object data may specify whether objects of a given class exist in an original image from which features are extracted, and may also include bounding box pixel coordinates of detected objects. Object data created with the object detection processor can be sent to the data storage circuit 827, and/or to communication link 823 for use in a variety of applications, such as in streaming object data or otherwise sending object data to a remote location.

In some applications, the integrated processing circuit 829 includes some or all of the processing functionality of the signal processor circuit 811. The integrated processing circuit 829 may include, for example, a CMOS-type processor or other processor with appropriate functionality. For instance, the compression processor circuit 813, or functionality similar thereto, can be selectively implemented with the integrated processing circuit 829. Similarly, the feature extraction processor circuit 815, or functionality similar thereto, is selectively implemented with the integrated processing circuit 829. Similarly, the object detection processor circuit 817, or functionality similar thereto, is selectively implemented with the integrated processing circuit 829.

In some applications, computation of final feature data or object data (e.g., the vision feature descriptors) is performed on the integrated processing circuit 829. In other applications, the image arrangement 803 transmits raw sensor data, or a compressed version of this data, to an external computational device, such as a desktop computer or mobile device (such as a mobile phone, tablet or wearable device). Computation of final images from the data is then performed on the external device.

As previously discussed, various embodiments include an apparatus with a photosensor array and circuitry configured to digitize ratios of pixel intensities of sensors of the photosensor array prior to sending to a processor circuit for further processing. In accordance with some embodiments, a rose-diagram based visualization (e.g., vision of feature descriptors) of Histogram of Oriented Gradients (HOG) features (e.g., feature descriptor data or feature-description data) based on the ratio of pixel intensity values and/or 2D gradients can be created. In various embodiments, the pixel intensity values are linearly proportional to pixel illuminance. The 2D gradients can, for example, vary based on both local scene illumination and global scene illumination or camera exposure settings.

To prevent this variation from degrading performance, many computer vision algorithms can include a normalization step in the pipeline. For example, HOG features can include local cell-level and/or block-level histogram normalization. Further, in various embodiments, HOG features based on 20 gradients with local cell-level histogram normalization can be applied against local scene illumination and invariant to global scene illumination or camera exposure settings.

However, example normalization schemes as described above, can rely on images being captured with a sufficiently high pixel bitdepth for the given scene dynamic range. In various embodiments, some scene information can be lost as pixel bitdepth is decreased. In imaging, a given scene's dynamic intensity range can be a function of the properties of the different sources of illumination in the scene, since different areas of a given scene can be illuminated by different sources. The dynamic range of a typical three dimensional (3D) scene can span roughly 9 orders of magnitude, depending on scene illumination: direct sunlight provides roughly 100,000 lumen per square meter (lux), whereas a moonless overcast sky provides about 0.0001 lux.

As previous explained, for photography application embodiments, adequately capturing a scene's dynamic range can be important for forming a visually appealing image. High quality cameras can capture images at high pixel bitdepths before additional image processing is performed. However, the power consumption in current mobile CMOS image sensors can dominated by the analog to digital conversion power, which is proportional to pixel bitdepth (to first order) (see, R. LiKamWa, et. al, "Energy Characterization and Optimization of Image Sensing Toward Continuous Mobile Vision", MobiSys 2013, which is fully incorporated by reference herein). Accordingly, aspects of the present disclosure can be useful for low-power computer vision applications that can use a reduced the bitdepth of analog to digital conversions per pixel without significantly reducing performance.

As explained previously, for many (computer) vision applications, including object detection, pixel intensity variations due to reflectance discontinuities and depth discontinuities are relevant to. Unlike pixel illumination variations, due to scene illumination, which can span roughly 9 orders of magnitude, the pixel illumination variation due to reflectance discontinuities under constant scene illumination that describes edges of interest span roughly 2 or fewer orders of magnitude (the illuminance ratio of a diffuse white surface vs. a diffuse black surface under the same scene illumination is typically less than 100:1). Furthermore, in some embodiments, the pixel illumination variation due to depth discontinuities that describes edges of objects of interest can also be represented with roughly 2 or fewer orders of magnitude without significant degradation in object detection performance.

As described above in connection with FIG. 1-7, embodiments are directed toward the recognition that the conversion of analog pixel intensity values and subsequent processing can consume a significant amount of power due to, among other considerations, the high resolution of the digital values, which is often used to capture images of acceptable quality.

Various embodiments can thereby use circuitry so that the, absolute pixel intensity values, which are subject to the roughly 9 orders of magnitude in variation due to scene illumination need not be digitized. Instead, only the ratios of adjacent pixel intensity values, whose values that describe edges of objects of interest only span 2 or fewer orders of magnitude, need to be digitized. Therefore, lower bitdepths of analog to digital conversions per pixel can be used to save power and/or energy consumption while still achieving the same performance as traditional implementations.

In various embodiments, a rose-diagram based visualization (e.g., a vision feature descriptor) of HOG features based on gradients of logarithms can formed. Alternatively, in some embodiments, a rose-diagram based visualization of HOG features based on gradients of logarithms for a simulated version of the same image can be formed where the exposure settings have been reduced by a factor of 2. Unlike traditional 2D gradients, gradients of logarithms can be robust against local scene illumination and invariant to global scene illumination or camera exposure settings. Local cell-level and/or block-level histogram normalization can also be applied to HOG features based on gradients of logarithms.

In some embodiments, a rose-diagram based visualization of HOG features can be formed based on gradients of logarithms extracted from the original image after local cell-level histogram normalization has been applied. HOG features based on gradients of logarithms with local cell-level histogram normalization applied can be more robust against local scene illumination than HOG features based on gradients of logarithms without local cell-level histogram normalization applied and invariant to global scene illumination or camera exposure settings.

In some embodiments, a custom database of annotated RAW images (e.g., minimally processed data from the image sensor) can be created and used in conjunction with a modified open source solution to the PASCAL Visual Object Classes Challenge as described below. The Pattern Analysis, Statistical Modelling and Computational Learning (PASCAL) Visual Object Classes (VOC) Challenge is an object detection competition with a publicly available database of images and annotations. The most recent competition, in 2012, included 11,530 annotated images, and 27,450 annotated objects (see, M. Everingham, et. al., "The PASCAL Visual Object Classes (VOC) Challenge, *Int'l. Journal of Computer Vision,* 88(2) (2010), 303-338). The images are in Joint Photographic Experts Group (JPEG) format. The annotations include the following 20 object classes: person, bird, cat, cow, dog, horse, sheep, airplane, bicycle, boat, bus, car, motorbike, train, bottle, chair, dining table, potted plant, sofa, television/monitor. Object annotations include bounding box coordinates, object class, pose, occlusion, and truncation. In various embodiments, to perform object detection, a relatively large database of annotated images may be used.

The PASCAL VOC database, however, may not be used directly to identify the performance of the 'gradient of logarithms' technique. Many imaging apparatuses apply a number of lossy transformations to the original image sensor data (including white balance, tone mapping, and JPEG compression) in order to create the JPEG images that are used in the PASAL VOC database (see, M. Everingham, et. al., "The PASCAL Visual Object Classes (VOC) Challenge, *Int'l. Journal of Computer Vision,* 88(2) (2010), 303-338). However, in accordance with various embodiments, the 'gradient of logarithms' technique can include working with the raw analog pixel signal values from the sensors, before any lossy transformations are applied. To evaluate the object detection performance of a system, in accordance with various embodiments, using the 'gradient of logarithms' technique, a database of images with the raw analog pixel intensity values can be used. Standard digital signal-lens reflex (DSLR) cameras can be operated to capture images where each analog pixel signal value is converted to a 12-bit digital value. This 12-bit value can be used to approximate the analog signal values indicative of pixel intensity values to a high precision.

A software program can be used to annotate these images according to the PASCAL VOC format, focusing on the object classes of person, car, and bicycle. For example, using an example DSLR camera, a plurality of images can be taken and the objects in the images can be annotated. As a particular example, out of over 4,000 images, a total of 1,443 cars, 3,774 persons, and 444 bicycles can be annotated. The scale of this example database is comparable to the PASCAL VOC database, as it contains roughly half as many images, but one seventh as many object classes. The images can be captured in both RAW and JPEG format to use JPEG images as a control group in object detection.

Since the model used for object detection can be just as important to performance as the low-level features used, a state of the art object detection model can be used. For example, object detection performance can be evaluated using a modified version of "voc-release5," which is an open source solution to the PASCAL VOC Challenge published by computer vision researcher Ross Girshick (see, Girshick, R. B., "*Discriminatively Trained Deformable Parts Models, release 5*", (2012)). This example software can be used to train a deformable parts model based on HOG features. Since HOG features are based on gradients, the software can be modified to use gradients of logarithms rather than linear gradients in the low-level features in order to evaluate the object detection performance of the 'gradient of logarithms' technique.

The voc-release5 code can be modified as described above, and object detection models can be trained and evaluated for the object classes of car, person, and bicycle. For example, for each class, five different models can be trained:

1. HOG features, based on histograms of linear gradients with local histogram normalization applied, can be extracted from JPEG images. This can represent the highest power consumption, as it requires a high resolution (typically 10 or 12 bit) analog to digital conversion of each pixel followed by an image signal processing chain which performs white balance, tone mapping, and JPEG compression. The final JPEG image represents each pixel with a bitdepth of 8. This can be used as a control group.
2. HOG features, based on histograms of linear gradients with local histogram normalization applied, can be extracted from RAW images.
3. HOG features, based on histograms of linear gradients without local histogram normalization applied, can be extracted from RAW images.
4. HOG features, based on histograms of gradients of logarithms with local histogram normalization applied, can be extracted from RAW images.
5. HOG features, based on histograms of gradients of logarithms without local histogram normalization applied, can extracted from RAW images.

Starting with RAW 12-bit values for each pixel, in some embodiments, bitdepth in software can be reduced to review the performance of feature extraction on lower bitdepth images. In cases 4-5, bitdepth refers to the bitdepth of the gradients of logarithms. In various embodiments, it can be assumed that the gradient of logarithms is computed in the analog domain. As such, the RAW 12-bit pixel intensity values can be used to compute the gradient of logarithms. Then, the computed gradient of logarithms can be converted to a digital value of arbitrary bitdepth (in this case, either 4, 3, or 2 bits). In various embodiments, a maximum possible value of the gradient of logarithms can be assumed (ln(5) in this case).

In accordance with various embodiment, object detection performance can decrease with decreasing bitdepth. Further, a large object detection performance can increase when local histogram normalization is applied to histograms of linear gradients as compared to un-normalized histograms of linear gradients. Local histogram normalization can account for variations in illumination or exposure and foreground-background contrast of objects in images, as described in the seminal paper in which HOG features were first introduced (see, N. Dalal and B. Triggs, "Histograms of Oriented Gradients for Human Detection", CVPR 2005, which is fully incorporated herein by reference).

Object detection performance for un-normalized histograms of gradients of logarithms can be better than un-normalized histograms of linear gradients, as gradients of logarithms are inherently invariant to variations in illumination or exposure, whereas linear gradients are not. In some embodiments, object detection performance can increase when local histogram normalization is applied to histograms of gradients of logarithms compared to un-normalized histograms of gradients of logarithms. For example, for all object classes, the object detection performance for HOG features based on histograms of gradients of logarithms (even at the lowest bitdepth of 2 bits) with local histogram normalization applied can nearly as high as the object detection performance for HOG features (extracted from JPEG images or the highest possible bitdepth RAW images of 12 bits) based on histograms of linear gradients with local histogram normalization applied.

In accordance with various embodiments of the present disclosure, features based on histograms of low bitdepth gradients of logarithms with local histogram normalization can perform similarly to features based on histograms of linear gradients with local histogram normalization extracted from high bitdepth JPEG images and can outperform features based on histograms of linear gradients with local histogram normalization extracted from low bitdepth RAW images.

As features can be extracted using low bitdepth images, features can be extracted, in some embodiments, that are mathematically equivalent to gradients of logarithms without applying a logarithmic compression to the signal values indicative of pixel intensity values. Thus, in some embodiments, lower power hardware implementation may not include a log compression circuit. The lower power hardware implemented can provide a digital representation of the ratio of pixel intensities.

Furthermore, if very low bitdepth digital representations of pixel intensity ratios are used, in accordance with some embodiments, additional energy/power can be saved as compared to traditional implementations in the feature extraction process beyond the energy/power savings associated with performing lower bitdepth analog to digital conversions per pixel. This is due to the fact the additional digital processing can be performed at lower bitdepths. For example, in an example embodiment, the components for a traditional HOG feature extraction implementation use a pixel bitdepth of 8. The digital computations (gradient calculation, gradient angle calculation, and histogram generation), for such an example, and memory read and write operations (to static random-access memory (SRAM)) may operate on 8-bit values.

By contrast, in an example embodiment, the components for a HOG feature extraction implementation based on gradients of logarithms use a gradient bitdepth of 2. A gradient calculation can be performed in the analog domain before or during the analog to digital conversion (represented by the Log Gradient Extraction block), and all digital computations and memory read and write operations (to SRAM) can operate on 2-bit values. This reduces bitdepth of the digital and memory operations and can result in a reduced energy and/or power requirement. In addition, in some embodiments, the computationally expensive steps of gradient angle calculation and histogram generation in the traditional implementation can be absorbed into a low power 4 bit look up table (LUT) operation in the 2 bit gradients of logarithms implementation.

The embodiments described herein may be implemented with a variety of applications, some of which are discussed above. In some embodiments, one or more embodiments are implemented with optical domain spatial low-pass filtering with low-power motion detection for surveillance. For instance, low-power motion detection can be performed continuously by detecting changes in pixel intensity values of a sensor array. If motion is detected, the surveillance camera can be operated in a higher power mode, for example, by increasing the resolution of the image capture. To achieve low-power, the camera can be used in a lower resolution mode. In some implementations, spatial low-pass filtering is carried out in the optical domain as described herein, after which the sensor array is point sampled. In some instances, this facilitates low-power consumption while simultaneously reducing missed detection of small objects. This can be achieved by setting an appropriate focus distance of the imaging apparatus such that the moving objects to be detected in the scene are out of focus. For instance, if a surveillance camera is aimed at a wall 10 meters away and is implemented to detect pedestrians walking directly in front of the wall (about 9 meters away from the camera), the focus distance of the camera could be set to 1 meter when in motion-detection mode such that the wall and pedestrians are out of focus. The camera images are point-sampled to reduce power consumption, and once motion is detected, the surveillance camera is refocused with a focus distance of 9 meters, such that the pedestrians are in focus and can be captured at full resolution.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., logarithmic functions, image capture and/or processing such as for subsampling/ spatially low-pass filtering, or gradient detection). For example, in certain of the above-discussed embodiments, one or more modules are discrete logic circuits or programmable logic circuits configured and arranged for implementing these operations/activities, as in the circuit modules shown in FIGS. 1-5 and 7-8. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/ activities.

Based upon the above discussion and illustrations, those skilled in the art will readily recognize that various modifications and changes may be made to the various embodiments without strictly following the exemplary embodiments and applications illustrated and described herein. For example, a variety of different types of lenses and apertures may be used alone and/or in combination. Further, processing functions may be carried out in different components and/or blocks as shown and described above. One or more embodiments directed to spatially filtering images may be implemented in connection with one or more aspects of embodiments directed to gradient detection. Further, approaches using readout voltage values can be implemented using other signal values, such as current values. In addition, the various embodiments described herein may be combined in certain embodiments, and various aspects of individual embodiments may be implemented as separate embodiments. Such modifications do not depart from the true spirit and scope of various aspects of the disclosure, including aspects set forth in the claims.

What is claimed is:

1. An apparatus comprising:
    a photosensor array having an array of sensors, each sensor being configured and arranged to provide a signal value for a pixel that is indicative of an intensity of light detected, with each signal value from the array of sensors including an analog signal indicative of a corresponding pixel intensity value; and
    circuitry configured and arranged to
        respond to signal values from a plurality of sensors of the photosensor array, by converting signals indicative of a ratio of pixel intensity values to a digital signal that characterizes at least edges of an object corresponding to or associated with the intensity of the detected light, and by providing digital signals, each indicative of a ratio of pixel intensity values for respective sensors of the photosensor array, and
        use the digital signals indicative of the ratio of pixel intensity values to form vision feature descriptors based on the edges corresponding with the intensity of light detected.

2. The apparatus of claim 1, further including a processor circuit separate from or as part of the aforesaid circuitry, configured and arranged to use the digital signals indicative of the ratio of pixel intensity values to assess a correlation of detected objects to heart-related physiological data concurrently captured with the detected light.

3. The apparatus of claim 1, further including:
    a processor circuit, and a communication circuit configured and arranged to provide the digital signals indicative of the ratio of pixel intensity values, to the processor circuit, and wherein the processor circuit is configured and arranged to operate on the digital signals for real-time object detection in a first image-processing mode wherein in response to detecting a trigger event relating to a particular category of object detection, the processor circuit is configured to transition from the first image-processing mode to a second image-processing mode in which the processor circuit receives and operates on more digital signals, corresponding to pixel intensity values, than received and operated on in the first image-processing mode.

4. The apparatus of claim 1, further including:
    a lens configured and arranged with a fixed aperture to pass the light from a scene to the photosensor array; and
    the photosensor array, configured and arranged to detect the light from the scene as passed through the fixed aperture and the lens via the array of sensors.

5. The apparatus of claim 1, wherein the circuitry is configured as an analog pixel intensity ratio to digital converter circuits and configured and arranged to capture time-stamped visual information about scene context.

6. The apparatus of claim 1, further including a processor circuit configured and arranged to operate on the digital signals for real-time object detection in an augmented reality application.

7. An apparatus comprising:
    a photosensor array having an array of sensors, each sensor being configured and arranged to provide a signal value for a pixel that is indicative of an intensity of light detected, with each signal value from the array of sensors including an analog signal indicative of a corresponding pixel intensity value; and circuitry including:
a first divider circuit configured to change an output of a first sensor of the array of sensors to produce a percentage of the output of the first sensor;
a second divider circuit configured to change an output of a second sensor of the array of sensors to produce a percentage of the output of the second sensor;
a first comparator configured and arranged to compare the percentage of the output of the first sensor to the output of the second sensor; and
a second comparator configured and arranged to compare the percentage of the output of the second sensor to the output of the first sensor.

8. The apparatus of claim 7, wherein the circuitry further includes:
the first divider circuit includes a first resistor divider network connected to a first input of the comparison circuit and an input of the first comparator configured and arranged to divide the output of the first sensor; and
the second divider circuit includes a second resistor divider network connected to a second input of the comparison circuit and an input of the second comparator configured and arranged to divide the output of the second sensor.

9. The apparatus of claim 7, wherein the two comparators are further each configured and arranged to output one of two digital signal values for the output of the first sensor and the output of the second sensor.

10. The apparatus of claim 7, wherein the circuitry further includes:
an analog logarithmic compression circuit connected to the output of the first sensor and an input of the first comparator, and connected to the output of the second sensor and an input of the second comparator, and configured and arranged to output analog signal values of a logarithm of the output of the first sensor and the output of the second sensor.

11. The apparatus of claim 10, wherein the circuitry is configured and arranged to provide an analog gradient output indicative of a difference between logarithmically compressed signal values from the first and the second sensors corresponding to respective pixels of interest.

12. The apparatus of claim 7, wherein the sensors of the photosensor array include logarithmic sensors configured and arranged to provide the signal value for the pixels that is logarithmically proportional to the intensity of light detected.

13. The apparatus of claim 7, wherein the apparatus is configured and arranged to switch from operating in a first imaging mode, the first imaging mode including use of the circuits to convert signals indicative of ratios of pixel intensity values of adjacent sensors of the array of sensors to digital signals, to a second imaging mode in response to detecting an object of interest using the digital signals, the first imaging mode including a lower power and a lower resolution than the second imaging mode; and
operating the apparatus in the second imaging mode to provide digital signals indicative of signal values from the photosensor array to a processor circuit without use of the circuitry.

14. A method for ascertaining characteristics of a scene, comprising:
capturing, using a photosensor array of an apparatus, image data from light rays, the photosensor array having an array of sensors, each sensor being configured and arranged to provide a signal value for a pixel that is indicative of an intensity of light detected, with each signal value from the array of sensors including an analog signal indicative of a corresponding pixel intensity value;
providing, using a readout circuit of the apparatus, signal values from a plurality of sensors of the array of sensors to circuitry of the apparatus;
providing, using the circuitry, an analog signal indicative of a ratio of pixel intensity values from adjacent sensors of the plurality of sensors based on the signals values;
converting, using the circuitry, the analog signal indicative of the ratio of pixel intensity values to digital signals that characterizes at least an edge of an object corresponding to or associated with the intensity of detected light, whereby the circuitry is configured and arranged to provide digital signals, each indicative of a ratio of pixel intensity values, for respective adjacent sensors of the plurality of sensors; and
detecting, using a processor circuit, the object by using the digital signals indicative of the ratio of pixel intensity values, to form vision feature descriptors based on the edges of at least the object corresponding with the intensity of light detected.

15. The method of claim 14, wherein the processor circuit ascertains gradient information using a logarithm of the digital signals and taking a difference of logarithms.

16. The method of claim 14, including using the one or more circuits to:
logarithmically compress the signal values;
providing an analog gradient output indicative of a difference between logarithmically compressed signal values of the sensors; and
converting the analog gradient output to the digital signals.

17. The method of claim 16, including the processor circuit detecting objects in the scene using at least one digital signal obtained from converting the analog gradient output, and the processor circuit operating in a first image-processing mode wherein in response to an indication that the object detection is associated with facial recognition, the processor circuit transitions from the first image-processing mode to a second image-processing mode in which the processor circuit receives and operates on more digital signals, corresponding to pixel intensity values, than received and operated on in the first image-processing mode.

18. The method of claim 17, including the processor circuit correlating physiological data concurrently captured with image data, to the detected objects using the digital signals.

19. The method of claim 14, including:
switching operation from the apparatus to a different apparatus in response to detecting the object of interest, the apparatus being configured and arranged to operate at lower power and a lower resolution than the different apparatus, wherein the detected object is detected using the digital signals provided by the circuitry.

20. The method of claim 14, further including capturing image data with the different apparatus, providing digital signals indicative of the pixel intensity values based on the image data to the processor circuit, and performing facial recognition techniques, using and based on the processor circuit and the digital signals indicative of the pixel intensity values.

21. The apparatus of claim 1, further including a processor circuit configured and arranged to receive the digital signals indicative of the ratio of pixel intensity values and to operate on the digital signals for real-time object detection in a first image-processing mode wherein in response to an indication that the object detection is associated with facial recognition, the processor circuit is configured to transition from the first image-processing mode to a second image-processing mode in which the processor circuit receives and operates on more digital signals, corresponding to pixel intensity values, than received and operated on in the first image-processing mode.

* * * * *